(12) United States Patent
Choi et al.

(10) Patent No.: US 11,383,200 B2
(45) Date of Patent: Jul. 12, 2022

(54) MEMBRANE PROCESS FOR H2 RECOVERY FROM SULFUR RECOVERY TAIL GAS STREAM OF SULFUR RECOVERY UNITS AND PROCESS FOR ENVIRONMENTALLY GREENER SALES GAS

(71) Applicant: Saudi Arabian Oil Company, Dhahran (SA)

(72) Inventors: Seung-Hak Choi, Dhahran (SA); Sebastien Andre Duval, Dhahran (SA); Milind Vaidya, Dhahran (SA); Feras Hamad, Dhahran (SA); Ahmad Bahamdan, Dhahran (SA); Ahmed Al-Talib, Dhahran (SA)

(73) Assignee: SAUDI ARABIAN OIL COMPANY

( * ) Notice: Subject to any disclaimer, the term of this patent is extended or adjusted under 35 U.S.C. 154(b) by 48 days.

(21) Appl. No.: 17/011,164

(22) Filed: Sep. 3, 2020

(65) Prior Publication Data

US 2022/0062818 A1    Mar. 3, 2022

(51) Int. Cl.
  *B01D 53/22*   (2006.01)
  *B01D 53/52*   (2006.01)
  (Continued)

(52) U.S. Cl.
  CPC ......... *B01D 53/229* (2013.01); *B01D 53/228* (2013.01); *B01D 53/52* (2013.01);
  (Continued)

(58) Field of Classification Search
  CPC ......... C01B 3/501; C01B 3/503; C01B 3/505; C01B 17/0404; C01B 17/0456;
  (Continued)

(56) References Cited

U.S. PATENT DOCUMENTS 5,558,698 A * 9/1996 Baker .................... B01D 53/22
                                                  423/229
5,843,395 A   12/1998 Wang
(Continued)

FOREIGN PATENT DOCUMENTS

EP      2023067 A1    2/2009
JP  20160041420 A     3/2016
(Continued)

OTHER PUBLICATIONS

Berchtold et al., "Polybenzimidazole composite membranes for high temperature synthesis gas separations", Journal of Membrane Science 415-416, 2012, pp. 265-270.
(Continued)

*Primary Examiner* — Timothy C Vanoy
(74) *Attorney, Agent, or Firm* — Bracewell LLP; Constance Gall Rhebergen

(57) ABSTRACT

Methods and systems are provided for treating the tail gas stream of a sulfur recovery plant. The methods including generating a tail gas stream from a sulfur recovery plant, treating the tail gas stream with a hydrogen sulfide removal unit and a hydrogen selective membrane unit, generating a stream low in hydrogen sulfide and a stream rich in hydrogen. The hydrogen sulfide rich stream is recycled to the sulfur recovery unit. The hydrogen selective membrane unit includes a glassy polymer membrane selective for hydrogen over hydrogen sulfide and carbon dioxide.

24 Claims, 4 Drawing Sheets

(51) Int. Cl.
  *B01D 53/75* (2006.01)
  *B01D 71/64* (2006.01)
  *C01B 3/06* (2006.01)
  *C01B 3/50* (2006.01)
  *C01B 17/04* (2006.01)
  *C10L 3/10* (2006.01)

(52) U.S. Cl.
  CPC .............. *B01D 53/75* (2013.01); *B01D 71/64* (2013.01); *C01B 3/06* (2013.01); *C01B 3/503* (2013.01); *C01B 17/0447* (2013.01); *C01B 17/0456* (2013.01); *C10L 3/102* (2013.01); *B01D 2053/221* (2013.01); *C01B 2203/0405* (2013.01); *C10L 2290/548* (2013.01)

(58) Field of Classification Search
  CPC .... B01D 53/226; B01D 53/229; B01D 53/52; B01D 53/73; B01D 53/75; B01D 61/00; B01D 61/58; B01D 63/00; B01D 65/00; B01D 2257/304; B01D 2257/108; B01D 2311/02; C10L 3/101; C10L 3/103
  See application file for complete search history.

(56) References Cited

U.S. PATENT DOCUMENTS

| | | | |
|---|---|---|---|
| 6,681,648 B1 | 1/2004 | Dye et al. | |
| 7,637,984 B2 | 12/2009 | Adamopoulos | |
| 8,388,744 B1 | 3/2013 | Polishchuk | |
| 8,518,356 B2 * | 8/2013 | Schaffer | C10K 1/004 423/220 |
| 11,040,874 B1 * | 6/2021 | Wasas | B01D 53/225 |
| 2006/0021502 A1 | 2/2006 | Young et al. | |
| 2006/0120948 A1 | 6/2006 | Agarwal et al. | |
| 2006/0260189 A1 * | 11/2006 | Reddy | C01B 32/50 48/128 |
| 2019/0009207 A1 | 1/2019 | Choi et al. | |

FOREIGN PATENT DOCUMENTS

| | | | | |
|---|---|---|---|---|
| KR | 101705799 A | 1/2017 | | |
| WO | 2011050439 A1 | 5/2011 | | |
| WO | WO 2011 050 439 A1 * | 5/2011 | ......... | C01B 17/0413 |
| WO | 2012064941 A1 | 5/2012 | | |
| WO | 2017074790 A1 | 5/2017 | | |

OTHER PUBLICATIONS

Borjigin et al., "Synthesis and characterization of polybenzimidazoles derived from tetra amino diphenyl sulfone for high temperature gas separation membranes", Polymer 71, 2015, pp. 135-142.

Choi et al., "A Highly Selective Polybenzimidazole-4,4'-(hexafluoroisopropylidene)bis (benzoic acid) Membrane for High-Temperature Hydrogen Separation", Journal of Applied Polymer Science, vol. 132, Issue 32, pp. 1-2, May 2015.

Etxeberria-Benavides et al., "PBI Mixed Matrix Hollow Fiber Membrane: Influence of ZIF-8 filler over H2/CO2 separation Performance at High Temperature and Pressure", Sepraration and Purification Technology 237, 2020, 116347, pp. 1-8.

Klaehn et al., "Blended polybenzimidazole and melamine-co-formaldehyde thermosets", Journal of Membrane Science 515, 2016, pp. 1-6.

Kong et al., "Ultrathin layered Pd/PBI-HFA composite membranes for hydrogen Separation", Separation and Purification Technology 179, 2017, pp. 486-493.

Kumbharkar et al., "High performance polybenzimidazole based asymmetric hollow fibre membranes for H2/CO2 separation", Journal of Membrane Science 375, 2011, pp. 231-240.

Kumbharkar et al., "Investigation of gas permeation properties of systematically modified polybenzimidazoles by N-substitution". Journal of Membrane Science 357, 2010, pp. 134-142.

Li et al.,"Influence of polybenzimidazole main chain structure on H2/CO2 separation at elevated temperatures", Journal of Membrane Science 461, 2014, pp. 59-68.

Naderi et al., "Molecular Design of Double Crosslinked Sulfonated Polyphenylsulfone/Polybenzimidazole Blend Membranes for an Efficient Hydrogen Purification", Journal of Membrane Science, vol. 563, pp. 726-733, Oct. 2018.

Naderi et al.,"H2/CO2 Separation Enhancement via Chemical Modification of Polybenzimidazole Nanostructure", Journal of Membrane Science, vol. 572, Feb. 15, 2019, pp. 343-349.

Pesiri et al., "Thermal optimization of polybenzimidazole meniscus membranes for the separation of hydrogen, methane, and carbon dioxide", Journal of Membrane Science 218, 2003, pp. 11-18.

SA51485 Disclosure Jan. 30, 2020Singh et al. "Polybenzimidazole based random copolymers containing hexafluoroisopropylidene functional groups for gas separations at elevated temperatures", Polymer 119 (2017), 134-141, 8 pages.

Singh et al., "High Temperature Polybenzimidazole Hollow Fiber Membranes for Hydrogen Separation and Carbon Dioxide Capture from Synthesis Gas", Energy Procedia 63, 2014, pp. 153-159.

Singh et al.,"H2 selective membranes for precombustion carbon capture", in: F. Shi, B. Morreale (Eds.), Novel Materials for Carbon Dioxide Mitigation Technology, Elsevier, Amsterdam, 2015, pp. 177-206.

Villalobos et al., "Fabrication of Polybenzimidazole/Palladium Nanoparticles Hollow Fiber Membranes for Hydrogen Purification", Advanced Energy Materials, vol. 8, Issue 3, pp. 1-3, 2018.

Yang et al., "Symmetric and Asymmetric Zeolitic Imidazolate Frameworks (ZIFs)/Polybenzimidazole (PBI) Nanocomposite Membranes for Hydrogen Purification at High Temperatures", Advanced Energy Materials, vol. 2, Issue 11, pp. 1-3, Jun. 2012.

PCT/US2021/048863 International Search Report and Written Opinion dated Dec. 9, 2021, 12 pgs.

* cited by examiner

MEMBRANE PROCESS FOR H2 RECOVERY FROM SULFUR RECOVERY TAIL GAS STREAM OF SULFUR RECOVERY UNITS AND PROCESS FOR ENVIRONMENTALLY GREENER SALES GAS

FIELD

This disclosure relates to methods and systems for treating a sulfur recovery tail gas stream. More specifically, this disclosure relates to removing $H_2S$ (hydrogen sulfide) and $H_2$ (hydrogen) from the tail gas stream from a sulfur recovery unit.

BACKGROUND

As part of natural gas processing and hydro-treatment of oil fractions, a large amount of $H_2S$ is produced. The conversion of $H_2S$ into elemental sulfur (S) is performed in a sulfur recovery unit (SRU). The most common process used for this conversion is known as the modified Claus treatment process, or alternately the Claus unit or modified Claus unit. The modified Claus treatment process is a combination of thermal and catalytic processes that are used for converting gaseous $H_2S$ into S.

Claus unit feed gases have a wide range of compositions. Feed gases originate from absorption processes using various solvents (amine, physical or hybrid solvents) to extract $H_2S$ from the by-product gases of petroleum refining, natural gas processing, and other industries using sour water stripper units.

The first process of a Claus unit is a thermal process in a reaction furnace. The feed gas to the Claus unit is burned in the reaction furnace using sufficient combustion air, or oxygen enriched air, to burn a stoichiometric one-third of the contained $H_2S$. The $H_2S$ from the feed gas is thermally converted into S, along with sulfur dioxide ($SO_2$). The reaction furnace operation is designed to maximize sulfur recovery in consideration of the feed composition, by adjusting air/oxygen feed, reaction temperature, pressure, additional fuel, and residence time. In addition, the reaction furnace destroys contaminants, such as hydrocarbons, that are present in the feed gas stream. Such contaminants pose problems for the catalytic reactors through the development of carbon-sulfur compounds that lead to plugging or deactivation of the catalyst beds.

The heated reaction product gas from the reaction furnace containing sulfur vapor is used to produce high pressure steam in a waste heat boiler, which also results in cooling the gas. The product gas is then further cooled and condensed in a heat exchanger. The condensed liquid S is separated from the remaining unreacted gas in the outlet end of the condenser and sent to a sulfur pit or other collection area.

The separated gas then enters the catalytic process of the Claus unit. The catalytic process contains between two and three catalytic reactors. Following the sulfur condenser, the separated gas is reheated and enters the first catalytic reactor. In the first catalytic reaction some of the $H_2S$ in the feed gas is converted into S through a reaction with the $SO_2$. The outlet product gas from the first catalytic reactor is cooled in a second condenser. Again, the condensed liquid S is separated from the remaining unreacted gas in the outlet end of the second condenser and sent to sulfur storage. The separated gas from the second condenser is sent to another re-heater and the sequence of gas reheat, catalytic reaction, condensation and separation of liquid S from unreacted gas is repeated for the second and third catalytic reactors.

For a well-designed and well-operated Claus sulfur recovery plant having three catalytic reactors, an overall sulfur recovery of 96-98% is achievable depending on the feed gas composition. To achieve higher recovery, a tail gas treatment unit must be added to further process the exhaust gas upstream of or as an alternative to an incinerator. Currently available tail gas treatment units are effective at achieving up to 99.9% or greater recovery, but add significant capital cost to the Claus treatment unit, often on the same order of magnitude as the Claus unit itself.

During the thermal step in a sulfur recovery unit, a large fraction of $H_2$ is generated during the thermal stage of sulfur recovery due to $H_2S$ splitting into S and $H_2$. A significant portion of the $H_2$ remains in the tail gas downstream catalytic converter and hydrogenation stages. Generally, 1.0 mol % to 3.0 mol % $H_2$ remains in the tail gas stream. $H_2$ is a valuable gas, but separating $H_2$ from the tail gas is difficult and expensive. Conventional membranes currently used in industrial applications can perform this separation, but the membranes are expensive and difficult to operate. Conventional membranes also suffer from low efficiency, since they struggle to efficiently and effectively separate $H_2$ from streams containing $H_2S$, carbon dioxide ($CO_2$), or nitrogen ($N_2$). Additionally, conventional membranes used for $H_2$ separation are unable to withstand the operating temperatures of a tail gas stream, requiring substantial cooling resulting in additional costs and equipment. Even if the conventional membranes can handle higher temperature, they often degrade over time at these temperatures, leading to a shortened membrane lifespan. These drawbacks make conventional membranes cost prohibitive.

There are many different types of conventional membranes, including porous membranes and dense polymer membranes. Various types of membranes operate via different methods. Dense polymer membranes operate through solution diffusion mechanisms. Gas transport through dense polymer membranes is governed by factors including the characteristics and properties of the gas and the membrane, including the partial pressures of the gas on either side of the membrane and the membrane thickness. Membrane permeability is a measure of the membrane's ability to permeate gas, normalized for pressure and membrane thickness. A measure of permeance is commonly expressed in terms of gas permeation unit (gpu), where 1 gpu is defined as $10^{-6}$ $cm^3$ (STP)/$cm^2 \cdot s \cdot cmHg$, which is also 1 Barrer/micron.

Membranes may be able to selectively transfer some compounds through the membrane over other compounds. Membrane selectivity is the measure of the ability of a membrane to separate two gases, and is a unitless value calculated as the ratio of the gases' permeabilities through the membrane. Membrane selectivity is calculated by the following equation:

$$\alpha_{ij} = \frac{P_i}{P_j}$$

The membrane selectivity equation can be rewritten as $$\alpha_{ij} = \left[\frac{D_i}{D_j}\right]\left[\frac{K_i}{K_j}\right]$$

The ratio $D_i/D_j$ is the ratio of the diffusion coefficients of the two gases and is commonly viewed as the mobility or diffusivity selectivity, reflecting the different sizes of the two molecules of the components i and j. The ratio $K_i/K_j$ is the ratio of the solubility coefficients of the two gases and is commonly viewed as the sorption or solubility selectivity, reflecting the relative solubilities of the gases.

Thus far conventional membranes have been unable to effectively and efficiently separate $H_2$ components from the tail gas streams of sulfur recovery units, especially at higher temperatures. Therefore, a need exists to effectively separate components of the tail gas streams so that the value of the $H_2$ gas is not lost, and the $H_2$ is more efficiently reused or recycled. Additionally, a need exists for high temperature tolerant membranes for use in sulfur recovery unit waste streams that also contain sulfur compounds. One or more of these needs are addressed by the invention.

SUMMARY

The disclosure relates to systems and methods for treating tail gas generated from a sulfur recovery operation. The sulfur recovery unit treats an acid gas including $H_2S$ and $CO_2$ and generates a sulfur stream and a sulfur recovery unit waste stream. The tail gas stream can include $H_2$, $CO_2$, $N_2$, and $H_2S$. Specifically, the disclosure relates to removing $H_2$ from a tail gas stream using $H_2$ selective membranes that selectively allows $H_2$ to permeate the membrane over $CO_2$, $H_2S$, and $N_2$. The methods and system also utilize an $H_2S$ removal unit to remove $H_2S$ from the tail gas stream. In some embodiments, the tail gas is treated with the $H_2$ selective membrane before being treated with $H_2S$ removal. In some embodiments, the tail gas is treated with $H_2S$ removal before being treated with the $H_2$ selective membrane. The treatment generates a stream rich in $H_2$ and a stream rich in $H_2S$. Depending on economics or on the position of the $H_2$ selective membrane, the $H_2$ rich stream can be sent to be combined with the sales gas to generate a greener, cleaner burning sales gas, or can be combined with the acid gas for acid gas treatment, or can be sent to further purification to generate a purer $H_2$ stream.

In some embodiments, the $H_2$ selective membrane can include glassy polymer materials, including polybenzimidazole (PBI) type polymers and copolymers. In some embodiments, the $H_2$ selective membrane can be made of a polymer material that is operable above 100° C., and up to and above 300° C. The $H_2$ selective membrane can be positioned in an $H_2$ selective membrane unit with multiple $H_2$ selective membranes and compressors.

In a first aspect, a method of treating tail gas generated from a sulfur recovery operation is provided to generate hydrogen gas or a greener natural gas. The method includes the steps of providing an acid gas stream to a sulfur recovery unit, the acid gas stream including carbon dioxide and hydrogen sulfide, and removing sulfur from the acid gas stream via the sulfur recovery unit to generate a sulfur recovery unit waste stream. The method further includes heating the sulfur recovery unit waste stream with a tail gas treatment reheater to create a heated sulfur recovery unit waste stream, and reacting the heated sulfur recovery waste stream in a tail gas treatment reactor operable to reduce sulfur compounds into hydrogen sulfide such that a tail gas stream is generated. The tail gas stream includes hydrogen, carbon dioxide, nitrogen, and hydrogen sulfide. The method further includes cooling the tail gas stream in a quench tower to generate a quench tower overhead stream. In the method, the quench tower overhead stream is treated in an overhead stream treatment process. The overhead stream treatment process includes an H2 selective membrane unit and an H2S removal unit. The H2 selective membrane unit includes an H2 selective membrane. The overhead stream treatment process generates an H2S rich recycle, an H2S lean stream, an H2 rich stream, and an H2 lean stream. The H2S rich recycle includes a higher concentration of hydrogen sulfide than the concentration of hydrogen sulfide in the H2S lean stream, and the H2 rich stream includes a higher concentration of hydrogen than the concentration of hydrogen in the H2 lean stream. The H2 rich stream is generated in the H2 selective membrane unit and the H2S rich recycle is generated in the H2S removal unit. The membrane also includes the step of recycling the H2S rich recycle to the sulfur recovery unit.

In certain aspects, the H2 selective membrane has a selectivity of hydrogen over carbon dioxide of at least 20. In certain aspects, the H2 selective membrane is operable at a includes a glassy polymer operable to function at an operating temperature of 100° C. to 300° C. without degradation. In certain aspects, the H2 selective membrane includes a PBI polymer. In certain aspects, the H2 selective membrane also includes palladium (Pd). In certain aspects, the H2 selective membrane also includes hydrofluoroalkane (HFA).

In certain aspects, the H2 selective membrane includes an aromatic polyamide layer formed on a porous support layer, and also includes a coating including the glassy polymer formed on the aromatic polyamide layer, where the glassy polymer has a glass transition temperature greater than 50° C. In some aspects, the glass polymer includes polyimide, polybenzimidazole, polyphenylsulfone, polyamide, polysulfone, polyphenyl ether, cellulose nitrate, cellulose diacetate, cellulose triacetate, poly(vinyl alcohol), poly(phenylene sulfide), poly(vinyl chloride), polystyrene, poly (methyl methacrylate), polyacrylonitrile, polytetrafluoroethylene, polyetheretherketone, polycarbonate, polyvinyltrimethylsilane, polytrimethylsilylpropyne, poly(ether imide), poly(ether sulfone), polyoxadiazole, poly (phenylene oxide), or a combination or copolymer or terpolymer thereof.

In some aspects, the PBI type polymer contains a compound selected from the group consisting of a hexaluoroisopropylidene functional group, a PBI polymer derived from tetra amino diphenyl sulfone, a PBI polymer derived from tetra amino diphenyl sulfone polymers, a PBI polymer derived from tetra amino diphenyl sulfone copolymers, an N-substitution modified PBI, a PBI and melamine-co-formaldehyde thermosets blend, a Pd/PBI-HFA composite, an ultrathin layered Pd/PBI-HFA composites, and combinations of the same.

In certain aspects, the step of treating the quench tower overhead stream in the H2 selective membrane unit and the H2S removal unit in the method further includes the steps of introducing the quench tower overhead stream to the H2 selective membrane unit before treatment in the H2S removal unit, so that the hydrogen gas is separated from the quench tower overhead stream before hydrogen sulfide is removed, generating the H2 lean stream from the H2 selective membrane unit, and then introducing the H2 lean stream to the H2S removal unit, so that the H2S removal unit produces the H2S rich stream and the H2S lean stream. In some aspects, the quench tower overhead stream includes at least 2 mol % hydrogen sulfide. In some aspects, the method further includes the steps of compressing the H2 rich stream in a plant compressor to generate a plant recycle, and recycling the plant recycle to a plant inlet for acid gas removal, so that processes natural gas from the plant inlet has an increased hydrogen content.

In some aspects, the H2 selective membrane unit includes a membrane feed compressor, a first H2 selective membrane, a permeate compressor, and a second H2 selective membrane, and the method further includes the steps of compressing the quench tower overhead stream in the membrane feed compressor to generate a compressed membrane feed stream, and introducing the compressed membrane feed stream to the first H2 selective membrane, where the first H2 selective membrane has a first H2 selective membrane permeate side and a first H2 selective membrane retentate side. The method further includes the steps of allowing hydrogen to permeate the first H2 selective membrane to generate an H2 rich permeate, removing the H2 rich permeate from the first H2 selective membrane permeate side, and removing the H2 lean stream from the first H2 selective membrane retentate side. The method also includes the steps of compressing the H2 rich permeate in the permeate compressor to generate a second membrane feed stream, and introducing the second membrane feed stream to the second H2 selective membrane, where the second H2 selective membrane has a second H2 selective membrane retentate side and a second H2 selective membrane permeate side. The method also includes the steps of allowing hydrogen to permeate the second H2 selective membrane to generate the H2 rich stream from the second H2 selective membrane permeate side, removing a membrane recycle stream from the second H2 selective membrane retentate side, and recycling the membrane recycle stream to the first H2 selective membrane retentate side.

In certain aspects, the step of treating the quench tower overhead stream in the H2 selective membrane unit and the H2S removal unit of the method further includes the steps of introducing the quench tower overhead stream to the H2S removal unit before treatment in the H2 selective membrane unit, so that hydrogen sulfide is removed from the quench tower overhead stream before hydrogen is removed from the quench tower overhead stream, generating an H2S lean stream from the H2S removal unit, and then introducing the H2S lean stream to the H2 selective membrane unit.

In some aspects, the H2S lean stream includes less than 150 ppm hydrogen sulfide. In some aspects, the method further includes the step of incinerating the H2 lean stream in an incinerator. In some aspects, the H2 rich stream is further processed to remove water, carbon dioxide, and nitrogen to produce a high-quality hydrogen stream. In some aspects, the H2 rich stream is added to plant fuel gas.

In some aspects, the H2 selective membrane unit includes a membrane feed compressor, a first H2 selective membrane, a permeate compressor, and a second H2 selective membrane and the method further includes the steps of compressing the H2S lean stream in the membrane feed compressor to generate a compressed membrane feed stream, introducing the compressed membrane feed stream to the first H2 selective membrane, where the first H2 selective membrane includes a first H2 selective membrane retentate side and a first H2 selective membrane permeate side, and allowing hydrogen to permeate the first H2 selective membrane to generate an H2 rich permeate. The method also includes the steps of removing the H2 rich permeate from the first H2 selective membrane permeate side, removing the H2 lean stream from the first H2 selective membrane retentate side, and compressing the H2 rich permeate in the permeate compressor to generate a second membrane feed stream. The method also includes the steps of introducing the second membrane feed stream to the second H2 selective membrane, where the second H2 selective membrane includes a second H2 selective membrane retentate side and a second H2 selective membrane permeate side, allowing hydrogen to permeate the second H2 selective membrane to generate the H2 rich stream from the second H2 selective membrane permeate side, removing a membrane recycle stream from the second H2 selective membrane retentate side, and recycling the membrane recycle stream to the first H2 selective membrane retentate side.

In a second aspect, a system for treating an acid gas contaminated stream to control emissions, generate hydrogen gas, or generate a greener natural gas is provided. The system includes a sulfur recovery unit, operable to convert sulfur compounds in an acid gas stream to elemental sulfur and further to generate a sulfur recovery unit waste stream. The system also includes a tail gas treatment reheater fluidically connected to the sulfur recovery unit, operable to heat the sulfur recovery unit waste stream to create a heated sulfur recovery unit waste. The system also includes a tail gas treatment reactor fluidically connected to the tail gas treatment reheater, operable to reduce sulfur compounds in the heated sulfur recovery unit waste stream to hydrogen sulfide, to generate a tail gas stream. The system also includes a quench tower fluidically connected to the tail gas treatment reactor, operable to reduce the temperature of the tail gas stream, to generate a sour water stream and a quench tower overhead stream. The system further includes an H2 selective membrane unit fluidically connected to the quench tower, operable to selectively remove hydrogen from the quench tower overhead stream through the H2 selective membrane to generate an H2 rich stream and an H2 lean stream. The system further includes an H2S removal unit fluidically connected to the H2 selective membrane unit, operable to absorb hydrogen sulfide from the H2 lean stream with a solvent and configured to regenerate the solvent, to generate an H2S lean stream and an H2S rich recycle.

In some aspects, the H2 selective membrane unit in the system further includes a membrane feed compressor, operable to compress the heated sulfur recovery unit waste stream, to generate a compressed membrane feed stream. The H2 selective membrane unit also includes a first H2 selective membrane, operable to selectively remove hydrogen from the compressed membrane feed stream through the first H2 selective membrane to generate an H2 rich permeate and the H2 lean stream, and a permeate compressor, operable to compress the H2 rich permeate to generate a second membrane feed stream. The H2 selective membrane unit also includes a second H2 selective membrane, operable to selectively remove hydrogen from the second membrane feed stream through the second H2 selective membrane, to generate the H2 rich stream and a membrane recycle stream.

In a third aspect, a system for treating an acid gas contaminated stream to control emissions, generate hydrogen gas, or generate a greener natural gas is provided. The system for treating the acid gas contaminated stream includes a sulfur recovery unit, operable to convert sulfur compounds in an acid gas stream to elemental sulfur and further to generate a sulfur recovery unit waste stream. The system also includes a tail gas treatment reheater fluidically connected to the sulfur recovery unit, operable to heat the sulfur recovery unit waste stream to create a heated sulfur recovery unit waste. The system also includes a tail gas treatment reactor fluidically connected to the tail gas treatment reheater, operable to reduce sulfur compounds in the heated sulfur recovery unit waste stream to hydrogen sulfide, to generate a tail gas stream. The system also includes a quench tower fluidically connected to the tail gas treatment reactor, operable to reduce the temperature of the tail gas stream, to generate a sour water stream and a quench tower overhead stream. The system also includes an H2S removal unit fluidically connected to the quench tower, operable to absorb hydrogen sulfide from the quench tower overhead stream with a solvent and configured to regenerate the solvent to generate an H2S lean stream and an H2S rich recycle. The system also includes an H2 selective membrane unit fluidically connected to the H2S removal unit, including an H2 selective membrane, operable to selectively remove hydrogen from the H2S lean stream through the H2 selective membrane to generate an H2 rich stream and an H2 lean stream.

In some aspects, the H2 selective membrane unit in the system further includes a membrane feed compressor, operable to compress the H2S lean stream to generate a compressed membrane feed stream, and a first H2 selective membrane, operable to selectively remove hydrogen from the compressed membrane feed stream through the first H2 selective membrane to generate an H2 rich permeate and the H2 lean stream. The H2 selective membrane unit can further include a permeate compressor, operable to compress the H2 rich permeate to generate a second membrane feed stream, and a second H2 selective membrane, operable to selectively remove hydrogen from the second membrane feed stream through the second H2 selective membrane, to generate the H2 rich stream and a membrane recycle stream.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

Figure 1:
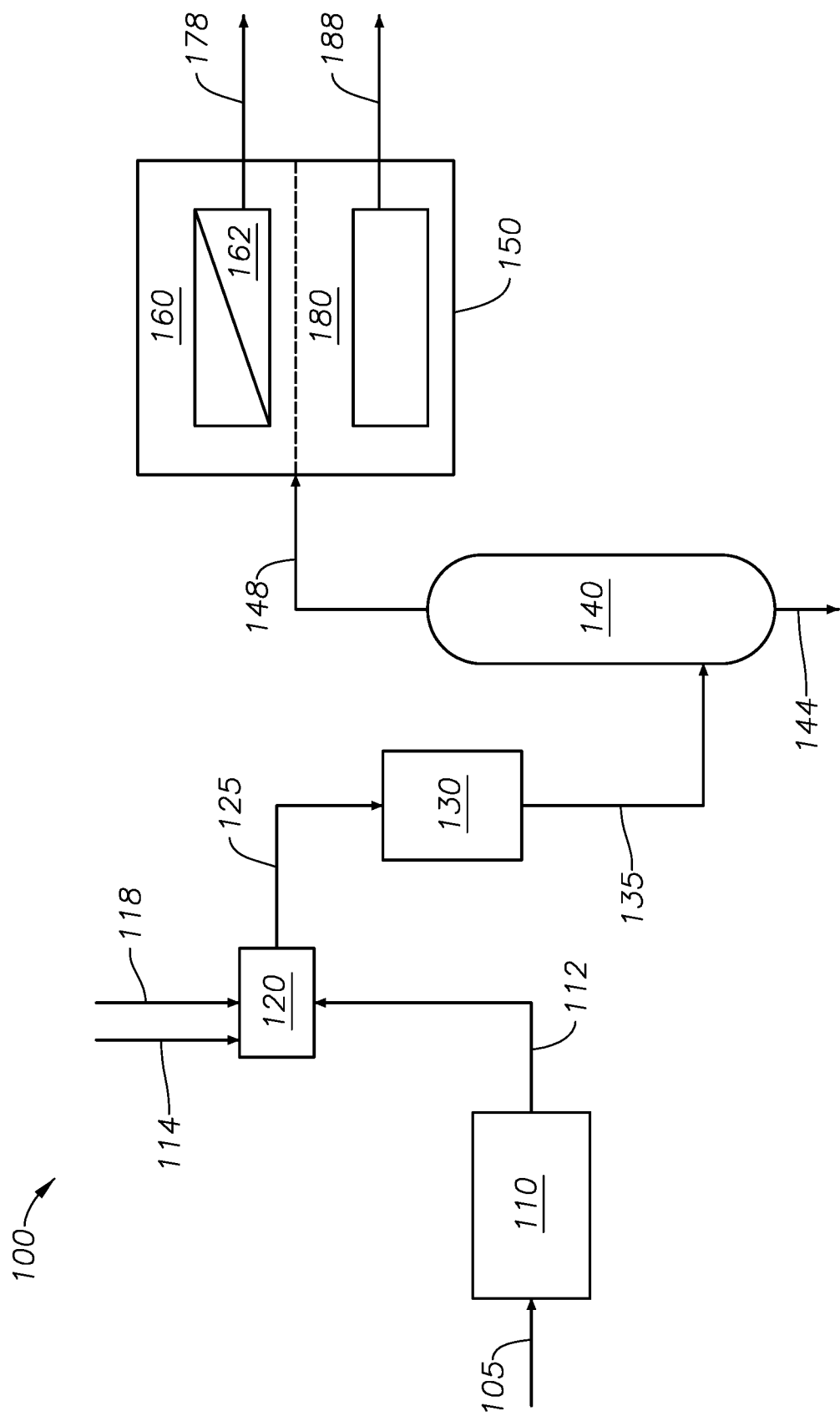
FIG. 1 is a block diagram of a tail gas treatment unit with both membrane treatment and absorber treatment, according to an embodiment.

In the accompanying Figures, similar components or features, or both, can have a similar reference label. For the purpose of the simplified schematic illustrations and descriptions of FIGS. 1 through 4, the numerous pumps, valves, temperature and pressure sensors, electronic controllers, and the like that can be employed and well known to those of ordinary skill in the art are not included. Transfer lines between the various components of the system can include pipes, conduits, channels, or other suitable physical transfer lines that connect by fluidic communication one or more system components to one or more other system components. Further, accompanying components that are in conventional industrial operations are not depicted. However, operational components, such as those described in the present disclosure, can be added to the embodiments described in this disclosure.

It should further be noted that lines and arrows in the drawings refer to transfer lines which can serve to depict streams between two or more system components. Additionally, lines and arrows that connect to system components define inlets or outlets in each given system component. The arrow direction corresponds generally with the major direction of movement of the materials of the stream contained within the physical transfer line signified by the line and arrow. Furthermore, lines and arrows which do not connect two or more system components signify a product stream which exits the depicted system or a system inlet stream which enters the depicted system. Product streams can be further processed in processing systems or can be end products. System inlet streams can be streams transferred from accompanying processing systems or can be processed or non-processed feed streams.

DETAILED DESCRIPTION

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

As used in this disclosure, a "membrane" refers to a structure through which mass transfer can occur under a variety of driving forces. The driving forces can be a pressure differential between the two sides of the membrane generated by a positive pressure on the retentate side of the membrane, a vacuum pressure on the permeate side of the membrane, stream component concentration differential between the permeate and retentate sides of the membrane, or combinations of the same. Driving forces that facilitate the transport of one or more components from the inlet gas stream through the selectively permeable membrane can be pressure, concentration, electrical potentials, or combinations thereof across the membrane. Membrane operation can be in any mode such as high pressure at the retentate side or vacuum pressure on the permeate side. The membrane allows a "penetrant" (a "penetrant" is an entity from a phase in contact with one of the membrane surfaces that passes through the membrane) to pass through the membrane from the retentate into the permeate. As used in this disclosure, the "retentate" is the stream that exits the membrane module without passing through the membrane, and has been depleted of penetrants. Membranes can be single or multi-layered. As used in this disclosure, the "permeate" used as a noun can refer to the stream containing penetrants that leaves the membrane module, or can refer to the liquids and gases that have permeated the membrane of a membrane unit. Permeate can also be used in this disclosure as a verb, and means to spread through or flow through or pass through a membrane of a membrane unit.

As used in this disclosure, "selective layer" refers to the membrane layer that is active in allowing the penetrant to pass through the membrane generating the permeate stream. As used in this disclosure, when a membrane is "selective for" a gas, that refers to the property of the membrane that allows more mass transport across the membrane material of one component as compared to the other component. For example, a $CO_2$ over $H_2S$ selective membrane preferentially transports $CO_2$ through the membrane in the presence of $H_2S$ and other components in the process stream to produce a $CO_2$-enriched permeate and a $CO_2$-depleted retentate.

As used in this disclosure, the selectivity of a membrane can be expressed as a unitless number for two compounds, shown by $X_1/X_2$, where $X_1$ is a first compound and $X_2$ is a second compound. $X_1/X_2$ is read as "$X_1$ over $X_2$." Membrane selectivity is the measure of the ability of a membrane to separate two gases, and is a unitless value calculated as the ratio of the gases' permeabilities through the membrane.

As used in this disclosure, "thin-film, composite membranes" refers to membranes that consist of a thin polymer barrier layer formed on one or more porous support layers. The polymer barrier layer determines the flux and separation characteristics of the membrane; the porous support serves as a support for the selective layer and can have no effect on membrane transport properties, or can affect membrane transport properties. As used in this disclosure, a reference to a membrane containing a specific material refers to the material used in the selective layer or the support layer. The support structure can be made of any material.

As used in this disclosure, a "membrane module" refers to a manifold assembly containing one or more membranes of the same or different composition to separate the streams of feed, permeate, and retentate. The membrane module can be any type of membrane module, including hollow fiber membrane modules, plate-and-frame membrane modules, spiral wound membrane modules, or potted hollow-fiber modules. Membranes can be arranged in the membrane module in a variety of configurations. Membranes can be in a flat-sheet configuration, a plate and frame configuration, or can be arranged to increase packing density, for example in hollow-fiber, capillary, or spirally-wound configurations. Multiple membranes can be utilized in a membrane module, including composite membranes, membranes made of multiple materials, and different types of membranes placed together in a membrane module.

As used in this disclosure, "air" refers to the collective gases or individual components of the collective gas that constitute earth's atmosphere. Unless otherwise indicated, the use of the term air includes any or all of the gases included in air.

Compositions are provided on a dry basis unless otherwise stated.

The description may use the phrases "in some embodiments," "in an embodiment," or "in embodiments," which can each refer to one or more of the same or different embodiments.

As used in this disclosure, the term "about" is utilized to represent the inherent degree of uncertainty that may be attributed to any quantitative comparison, value, measurement, or other representation, and is also utilized in this disclosure to represent the degree by which a quantitative representation can vary from a stated reference without resulting in a change in the basic function of the subject matter at issue.

In embodiments of the present disclosure, methods and systems for separating and removing $H_2$ and $H_2S$ from the tail gas stream of a sulfur recovery unit are disclosed. The sulfur recovery unit treats acid gas including $H_2S$ and $CO_2$ and generates a sulfur stream and a sulfur recovery unit waste stream. The sulfur recovery unit waste stream can be treated with a reheater and a reactor, generating a tail gas stream which is cooled in a quench tower. The tail gas stream can include $H_2$, $CO_2$, $N_2$, and $H_2S$. The quench tower overheads can be treated with an $H_2$ selective membrane and an $H_2S$ removal unit. The $H_2S$ removal unit can be an absorption unit. The quench tower overheads can either be treated by the $H_2$ selective membrane before the $H_2S$ removal unit, or treated first in the $H_2S$ removal unit before the $H_2$ selective membrane. The treatment generates a stream rich in $H_2$ and a stream rich in $H_2S$. Depending on economics or on the position of the $H_2$ selective membrane, the stream rich in $H_2$ can be sent to be combined with the sales gas to generate a greener, cleaner burning sales gas, or can be combined with the acid gas for acid gas treatment, or can be sent to further purification to generate a purer $H_2$ stream.

The $H_2$ selective membrane is generally a dense polymer membrane that preferentially allows $H_2$ to permeate the membrane over other compounds in the stream. The $H_2$ selective membrane can include glassy polymer materials, including polybenzimidazole (PBI) polymers. The $H_2$ selective membrane can be made of a polymer material that is operable above 100° C., and up to and above 300° C. The $H_2$ selective membrane can be positioned in an H2 selective membrane unit with multiple $H_2$ selective membrane stages or steps and compressors.

Advantageously, the embodiments disclosed herein solve many problems. The embodiments advantageously recover $H_2$ gas, which can be a valuable gas stream that would otherwise be lost to atmosphere or burned in an incinerator. The embodiments of the invention reduce the amount of undesirable $H_2S$ released to atmosphere or combusted as there is no need to combust large amount of $H_2S$ in a flare or thermal oxidizer producing $SO_2$, since the $H_2S$ recovered from the tail gas stream and can be recycled to the acid gas stream fed to the sulfur recovery unit. Embodiments of the invention can also be deployed as a retrofit to existing operations. Additionally, embodiments of the invention include membranes selective for $H_2$ over other components that are operable and maintain operability without degradation for substantial periods, the separation of the $H_2$ can be achieved with less cooling of the tail gas stream.

Referring now to the figures, block diagrams are provided showing embodiments of the invention. FIG. 1 is a block diagram of tail gas treating system 100 with both membrane treatment and absorption treatment, according to one or more embodiments described in this disclosure. Acid gas stream 105 is introduced to sulfur recovery unit 110. Acid gas stream 105 includes $H_2S$, $CO_2$, water, other sulfur compounds, and impurities. Acid gas stream 105 can be generated from oil and gas processing operations, mining operations, or any other operations that can generate streams of acid gas. Acid gas stream 105 can have any concentration of $H_2S$ or $CO_2$, and can be at any temperature and pressure. The composition of acid gas stream 105 can vary. In some embodiments, acid gas stream 105 contains greater than 40 mol % $H_2S$ and greater than 50 mol % $CO_2$. In some embodiments, acid gas stream 105 contains between about 10 to about 90 mol % $H_2S$, The pressure for acid gas stream 105 can be from about 2 psig to about 15 psig, and the temperature acid gas stream 105 can be from about 20° C. to about 260° C. In an embodiment, acid gas stream 105 is generated in an acid gas treatment unit from oil and gas operations. Sulfur recovery unit 110 can be any type of process unit that removes sulfur from a gas stream. In some embodiments, sulfur recovery unit 110 is a Claus plant, which utilizes combustion, heaters, coolers, and catalytic converters to convert $H_2S$ to S. Sulfur recovery unit 110 can be operated at any temperature, pressure, and operating conditions necessary to convert sulfur compounds such as $H_2S$ to S. Sulfur recovery unit 110 generates sulfur recovery unit waste stream 112. Sulfur recovery unit waste stream 112 includes $N_2$, CO, $H_2$, $H_2S$, $CO_2$, $SO_2$, and other components. In some embodiments, sulfur recovery unit waste stream 112 contains greater than 40 mol % $N_2$, greater than 20 mol % $CO_2$, great than 1 mol % $H_2$, and greater than 0.3 mol % $H_2S$. In some embodiments, the pressure of sulfur recovery unit waste stream 112 is in the range of about 15 to 30 psia. In some embodiments, the temperature of sulfur recovery unit waste stream 112 is greater than 200° C. Sulfur recovery unit waste stream 112 is introduced to tail gas treatment reheater 120. Tail gas treatment reheater 120 increases the temperature of sulfur recovery unit waste stream 112. Tail gas treatment reheater 120 can be any type of heater or reheater capable of increasing the temperature of sulfur recovery unit waste stream 112. Fuel gas stream 114 can also be introduced to tail gas treatment reheater 120. Fuel gas stream 114 can include any type of fuel compatible with tail gas treatment reheater 120. In some embodiments, fuel gas stream 114 is natural gas. Fuel gas stream 114 can be at any temperature and pressure. Air stream 118 is also introduced to tail gas treatment reheater 120. Air stream 118 can include air. Air stream 118 can be at any temperature and pressure.

Heated sulfur recovery unit waste stream 125 exits tail gas treatment reheater 120 and enters tail gas treatment reactor 130. Heated sulfur recovery unit waste stream 125 can have a temperature in the range of about 260° C. to about 310° C. Heated sulfur recovery unit waste stream 125 can have a pressure in the range of about 15 to 20 psia. Tail gas treatment reactor 130 reduces the sulfur compounds in heated sulfur recovery unit waste stream 125, such that S compounds convert to $H_2S$. Tail gas treatment reactor 130 can be any type of reactor capable of reducing compounds. Tail gas treatment reactor 130 can operate between 260° C. to 310° C. Tail gas treatment reactor 130 can use a Co—Mo catalyst type. In some embodiments, tail gas treatment reactor 130 is a SCOT process catalytic converter.

Tail gas stream 135 exits tail gas treatment reactor 130. Tail gas stream 135 includes $H_2$, $CO_2$, $H_2S$, and $N_2$. Tail gas stream 135 includes a recoverable amount of $H_2$ with an $H_2$ concentration in a range of about 1.0 mol % to about 3.0 mol %. Tail gas stream 135 has a concentration of $H_2$ in the range of about 0.1 mol % to about 5 mol %, or alternately about 0.5 mol % to about 4 mol %. Tail gas stream 135 includes a concentration of $H_2S$ in the range of about 2.0 mol % to about 4.0 mol %, alternately about 1.8 mol % to about 3.0 mol %, alternately about 1000 ppmv to about 5.0 mol %, alternately about 200 ppmv to about 4.0 mol %, or alternately about 50 ppmv to about 3.5 mol %. Tail gas stream 135 includes a level of $H_2S$ below 150 ppmv. Tail gas stream 135 can also include $CO_2$ and $N_2$. The concentration of $CO_2$ in tail gas stream 135 can be in the range of about 10 mol % to about 50 mol %, alternately about 20 mol % to about 40 mol %. In an embodiment, the concentration of $N_2$ in tail gas stream 135 can be in the range of about 25 mol % to about 80 mol %, alternately about 30 mol % to about 75 mol %, or alternately about 40 mol % to about 60 mol %. Tail gas stream 135 can include any concentration of $H_2$ and $H_2S$. Tail gas stream 135 can be in the range of about 500° F. to about 600° F., or about 260° C. to about 315° C. Tail gas stream 135 can have a pressure in the range of about 1 to 3 psig.

Tail gas stream 135 is introduced to quench tower 140. Quench tower 140 cools tail gas stream 135. Any type of tower capable of cooling tail gas stream 135 can be used as quench tower 140. In some embodiments, quench tower 140 utilizes water to cool tail gas stream 135. Quench tower 140 can also remove the small quantities of contaminants ($SO_2$ and ammonia) from tail gas stream 135, which can affect and contaminate the amine units removing $H_2S$ from the gas streams. Quench tower 140 can cool tail gas stream 135 to any temperature. Tail gas stream 135 is cooled to generate quench tower overhead stream 148. Quench tower 140 generates the sour water stream 144 and quench tower overhead stream 148. The sour water stream 144 includes water contaminated with sulfur compounds, acid gas components, and ammonia scrubbed from tail gas stream 135.

Quench tower overhead stream 148 can be at any temperature and pressure. In some embodiments, quench tower overhead stream 148 is at a temperature between 100° C. and 300° C. In some embodiments, quench tower overhead stream 148 can have a temperature of greater than about 40° C. and a pressure of about 1 to 5 psig. Quench tower overhead stream 148 can have the same dry basis composition as tail gas stream 135, and is saturated with water vapor.

Quench tower overhead stream 148 is treated in overhead stream treatment process 150. Overhead stream treatment process 150 includes H2 selective membrane unit 160 and H2S removal unit 180. Overhead stream treatment process 150 generates H2 rich stream 178 and H2S rich recycle 188. H2 rich stream 178 is generated from H2 selective membrane unit 160, and H2S rich recycle 188 is generated from H2S removal unit 180. The H2S lean stream (not pictured) and the H2 lean stream (not pictured) are also generated from overhead stream treatment process 150.

H2S removal unit 180 can be a piece of equipment or a group of equipment operable to separate and remove H2S. H2S removal unit 180 can be an absorption unit, configured to absorb H2S into a media. H2S removal unit 180 can be a group of separate pieces of equipment, each piece of equipment performing a different function necessary to contact an absorbing material to a gas stream, regenerate the absorbing material, generate a stream rich in $H_2S$ and a stream lean in $H_2S$, and transport the absorbing material or the gas streams. H2S removal unit 180 can include equipment such as an absorption tower, a regeneration stripping tower, a regeneration heater, pumps, and other necessary equipment. In some embodiments, H2S removal unit 180 includes an amine absorption unit and regeneration unit. In some embodiments, H2S removal unit 180 includes an $H_2S$ selective amine, such as methyldiethanolamine (MDEA), which selectively absorbs more $H_2S$ than $CO_2$. In other embodiments, H2S removal unit 180 includes an amine that absorbs $H_2S$ and $CO_2$, such as diethanolamine (DEA), monoethanolamine (MEA), diisopropanolamine (DIPA), and aminoethoxyethanol also known as diglycolamine (DGA). H2S removal unit 180 can include a solvent that absorbs $H_2S$ from a stream, and can operate at typical amine absorption operating conditions, such as a feed gas temperature of about 100° F. and a feed gas pressure of between about 1 and 5 psig. H2S removal unit 180 can be a regenerative bed absorption unit such as a molecular sieve bed. H2S removal unit 180 can be a series of $H_2S$ selective membranes. The operating conditions of H2S removal unit 180 can vary depending on the process units and media used.

H2 selective membrane unit 160 can be a piece of equipment or group of equipment, with equipment that includes H2 selective membrane 162. H2 selective membrane unit 160 can separate $H_2$ from a gas stream. H2 selective membrane unit 160 includes a membrane module. H2 selective membrane unit 160 can include equipment such as compressors, pumps, vacuums, and any other equipment necessary to treat the gas streams with H2 selective membrane unit 160. H2 selective membrane unit 160 can be configured in any way to enhance the permeation of $H_2$ through H2 selective membrane 162.

H2 selective membrane unit 160 includes an H2 selective membrane 162. H2 selective membrane 162 is a membrane selective for $H_2$ over other components in a fluid stream, including in the presence of $H_2S$, $CO_2$, and water vapor. H2 selective membrane 162 can have a selective layer which selectively permeates $H_2$ over the other components in the stream. In some embodiments, H2 selective membrane 162 has a selectivity for $H_2$ over $CO_2$ of greater than about 3, or alternately greater than about 10, or alternately greater than about 15, or alternately greater than about 20, or alternately greater than about 30, or alternately greater than about 35, or alternately greater than about 40. In an embodiment, H2 selective membrane 162 has a high flux, allowing for $H_2$ to permeate H2 selective membrane 162 at high rates. The feed to H2 selective membrane 162 can be in a temperature range of 25° C. to 350° C., alternately 100° C. to 350° C., alternately 150° C. to 300° C., alternately 200° C. to 300° C., and alternately 150° C. to 250° C. The pressure of feed to H2 selective membrane 162 can be in the range of 30 psia to 150 psia, alternately 50 psia to about 100 psia.

H2 selective membrane 162 can include a support layer and a selective layer. H2 selective membrane 162 can be made of one or more materials, which can be part of the support layer or the selective layers. H2 selective membrane 162 can be a thin-film, composite membrane. H2 selective membrane 162 can include a multilayer aromatic polyamide thin-film composite membrane. H2 selective membrane 162 can be a flat sheet membrane. The thickness of the selective layer of H2 selective membrane 162 can be any thickness. In some embodiments, the selective layer is in the range of 1 μm to 10 μm, or alternately in the range of 0.1 μm to 5 μm.

H2 selective membrane 162 can include a glassy polymer. The glassy polymer can be moisture resistant. In some embodiments, H2 selective membrane 162 includes a PBI polymer. In some embodiments, H2 selective membrane 162 includes a PBI polymer and Pd. In some embodiments, H2 selective membrane 162 includes an aromatic polyamide selective layer formed on a porous support layer. In some embodiments, the aromatic polyamide selective layer is coated with a glassy polymer. The glassy polymer can have a glass transition temperature greater than 50° C., alternately greater than 100° C., or alternately greater than 150° C.

In some embodiments, the H2 selective membrane 162 includes glassy polymer materials, including PBI-type polymers and copolymers. In some embodiments, the PBI type polymer contains hexaluoroisopropylidene functional groups, PBIs derived from terra amino diphenyl sulfone, PBIs derived from tetra amino diphenyl sulfone polymers and copolymers, N-substitution modified PBIs, and PBI and melamine-co-formaldehyde thermosets blend. The PBI-type polymer can be a homopolymer, a copolymer, an alternating copolymer type, a random copolymer type, a block type copolymer, a terpolymer, an alternating terpolymer type, a random terpolymer type, a block type terpolymer, and any other type of polymer layout. The polymers can be random copolymer types, alternating types, and block types. The H2 selective membrane 162 can contain an ultrathin layer Pd/PBI-HFA composite membrane.

In some embodiments, the glassy polymer includes polyimide, polybenzimidazole, polyphenylsulfone, polyamide, polysulfone, polyphenyl ether, cellulose nitrate, cellulose diacetate, cellulose triacetate, poly(vinyl alcohol), poly(phenylene sulfide), poly(vinyl chloride), polystyrene, poly(methyl methacrylate), polyacrylonitrile, polytetrafluoroethylene, polyetheretherketone, polycarbonate, polyvinyltrimethylsilane, polytrimethylsilylpropyne, poly (ether imide), poly(ether sulfone), polyoxadiazole, poly (phenylene oxide), or a combination or copolymer or terpolymer of the listed glassy polymers. In some embodiments, the glassy polymer is functionalized. Functionalized glassy polymers can include sulfonated glassy polymers and halogenated glassy polymers, such as brominated glassy polymers. Examples of suitable glassy polymers include brominated polyimide, brominated polysulfone, and brominated poly (phenylene oxide).

In some embodiments, H2 selective membrane 162 is selected from a material disclosed in US. Pat. Pub. 2019/0009207, which is incorporated herein in its entirety. In some embodiments, H2 selective membrane 162 includes a porous support layer, an aromatic polyamide layer as the selective layer formed on the porous support layer via interfacial polymerization, and a coating forming a portion of the selective layer including the glassy polymer formed on the aromatic polyamide layer. In interfacial polymerization, a reaction occurs between reactive components at an interface of two immiscible solvents. The porous support layer is saturated with an aqueous solution containing a monomeric arylene polyamine, such as m-phenylenediamine, by immersion or spraying. After saturation, porous support is immersed in a water-immiscible solvent in which a monomeric acyl halide, such as trimesoyl chloride, has been dissolved. Interfacial polymerization is initiated in situ, forming aromatic polyamide layer directly on porous support. The polyamide layer and the porous support are dried to yield a composite membrane. In some embodiments, the porous support has a backing layer, such as porous substrate, such that aromatic polyamide layers are a crosslinked aromatic polyamide layer formed on porous support, respectively, by interfacial polymerization.

In some embodiments, the porous support layer includes a substrate. The porous support layer can be mesoporous polymeric membrane supports suitable for microfiltration, ultrafiltration, or nanofiltration. The porous support layer can have a thickness in a range of 10 μm to 1000 μm. The thickness of porous layer can be in a range of 30 μm to 100 μm. The surface pores in the porous support layers can be non-uniform and have dimensions in a range of 1 nm to 100 μm.

H2 selective membrane 162 can include a glassy polymer coating, which is formed on aromatic polyamide layers. The thickness of polyamide layers can be in a range of 20 nm to 200 nm. Glassy polymer coatings are formed on aromatic polyamide layers by slot die coating, spin coating, dip coating, or spray coating a solution including a glassy polymer on the aromatic polyamide layer, effectively plugging pores or defects in aromatic polyamide layers and yielding a multilayer aromatic polyamide thin film composite membrane suitable for gas separation. The thickness of the glassy polymer coating can be in a range of 10 nm to 1 μm.

In an embodiment, H2 selective membrane 162 is a PBI-type polymer membrane that includes PBI with an $H_2/CO_2$ selectivity of about 47 and an $H_2$ permeability of 7 Barrers at 250° C. In an embodiment, H2 selective membrane 162 includes a PBI material of poly(5,5'-benzimidazole-2,2'-diyl-1,3-phenylene). In an embodiment, H2 selective membrane 162 includes a PBI type polymer with $H_2/CO_2$ selectivity of about 21 with an $H_2$ permeability of 1 gpu at an operating temperature of 300° C. In an embodiment, H2 selective membrane 162 is a PBI-type polymer membrane with an $H_2/CO_2$ selectivity of about 47 and an $H_2$ permeability of 3.6 Barrers at an operating temperature of 35° C. In an embodiment, H2 selective membrane 162 is a PBI-type polymer membrane including m-PBI with an $H_2/CO_2$ selectivity of about 23 and an $H_2$ permeability of 76.8 Barrers at an operating temperature of 250° C. In an embodiment, H2 selective membrane 162 is a PBI-type polymer membrane including m-PBI with an $H_2$ permeance of 500 gpu and an $H_2/CO_2$ selectivity of about 19 at an operating temperature of 250° C.

In an embodiment, H2 selective membrane 162 includes PBI, polyimide, and polybenzoxazole (PBO) materials that demonstrate thermal stability characteristics allowing operating temperatures in excess of 150° C. In an embodiment, H2 selective membrane 162 includes m-PBI which can be operational for an extended period of time at elevated temperatures exceeding 250° C., with $H_2/CO_2$ selectivity of about 43, and $H_2/N_2$ selectivity of about 233 at 250° C. in the presence of $H_2S$. In an embodiment, H2 selective membrane 162 includes a PBI with an $H_2$ permeance of approximately 100 gpu and an $H_2/CO_2$ selectivity of about 25 and $H_2/N_2$ selectivity of about 100 at operating temps exceeding 250° C. In an embodiment, H2 selective membrane 162 includes a PBI/zeolitic imidazolate framework (ZIF) composite membrane with an $H_2$ permeability of 470 Barrer and $H_2/CO_2$ selectivity of about 26.3 at 230° C. in the presence of water vapor.

In an embodiment, H2 selective membrane 162 includes PBI polymers or PBI copolymers with an $H_2/CO_2$ selectivity of about 23 with $H_2$ permeability of 76.8 Barrers at 250° C. In an embodiment, H2 selective membrane 162 is PBI based with 6F-PBI, a highly disrupted loosely packed hexafluoroisopropylidene diphenyl group with PBI segments, and m-PBI, a highly selective tightly packed phenylene group containing PBI segments.

In an embodiment, H2 selective membrane 162 is a PBI asymmetric hollow fiber membrane for $H_2/CO_2$ selective separation at high temperatures from 100° C. to 400° C., an $H_2$ permeance of $2.6 \times 10^{-6}$ cm$^3$ (STP)/cm$^2$·s·cmHg, and an $H_2/CO_2$ selectivity of about 27.

In an embodiment, H2 selective membrane 162 includes a PBI made of sulfonyl-containing a tetra-amine monomer TADPS (3,3',4,4'-tetraaminodiphenylsulfone monomer), such as TADPS-IPA (tetraaminodiphenylsulfone-isophthalic acid polybenzimidazole), TADPS-TPA (tetraaminodiphenylsulfone-terephthalic acid polybenzimidazole), or TADPS-OBA (tetraaminodiphenylsulfone-oxybis(benzoic acid) polybenzimidazole). In an embodiment, H2 selective membrane 162 includes TADPS-TPA with an $H_2/CO_2$ selectivity of at least about 20. In an embodiment, H2 selective membrane 162 includes TADPS-OBA with an $H_2/CO_2$ selectivity of at least about 10. In an embodiment, H2 selective membrane 162 includes TADPS-IPA with an $H_2/CO_2$ selectivity of at least about 32.

In an embodiment, H2 selective membrane 162 is a PBI type polymer membrane with an $H_2/CO_2$ mixed gas selectivity of about 20 at 250° C. with an $H_2$ permeability of 7 Barrers. In an embodiment, H2 selective membrane 162 is a PBI type polymer membrane exhibits thermal stability excellence and is resistant to acids, bases, and organic solvents. In an embodiment, H2 selective membrane 162 is a PBI type polymer membrane with an $H_2/CO_2$ selectivity of about 20 and an $H_2$ permeance between 9 and 13 in the operating range of 200° C. to 270° C.

In an embodiment, H2 selective membrane 162 is a PBI type polymer membrane with an $H_2$ permeability of 2.1 Barrer and an $H_2/CO_2$ selectivity of about 11.3 at 25° C. In an embodiment, H2 selective membrane 162 includes DMPBI-I, PBI-I, DBPBI-I, DSPBI-I, DBzPBI-I, DMPBI-BUL, DBPBI-Bul, DSPBI-Bul, DBzPBI-Bul, or PBI-Bul.

In an embodiment, H2 selective membrane 162 includes a blend of PBI and other materials with an $H_2$ permeability of 57 Barrer and an $H_2/CO_2$ selectivity of about 12.9 at an operating temperature of 250° C. In an embodiment, H2 selective membrane 162 includes a PBI and PMF (poly (melamine co-formaldehyde)) polymer blend. In an embodiment, H2 selective membrane 162 including the PBI and PMF blend has an $H_2$ permeability of 2.1 Barrer and an $H_2/CO_2$ selectivity of about 25.8 at an operating temperature of 30° C.

H2 selective membrane 162 can include metal and metal alloys, such as Pd, vanadium, nickel, niobium, and iron, or Pd alloys with silver, ruthenium, gold, and copper. H2 selective membrane 162 can include metal oxides, zeolites, and carbon molecular sieves, amorphous silicas, non-silica metal oxides including $ZrO_2$ and $TiO_2$, zeolite membranes; microporous carbon membranes; dense ceramic membranes, vanadium, niobium, zirconium and tantalum alloys, and graphenes. H2 selective membrane 162 can include a porous stainless steel support with zirconia intermediate layer.

In an embodiment, H2 selective membrane 162 is a Pd/PBI-HFA composite membrane with an $H_2$ permeance of 262 Barrer and an $H_2/CO_2$ selectivity of about 22 at an operating temperature of 150° C. In an embodiment, H2 selective membrane 162 is a PBI-HFA membrane with an $H_2$ permeance of 276 Barrer and an $H_2/CO_2$ selectivity of about 22 at an operating temperature of 150° C.

In an embodiment, H2 selective membrane 162 includes a selective layer made of PROTEUS™ co-polymer (available from Mitsubishi Chemical Advanced Materials) with an $H_2$ permeability of approximately 50 Barrer and $H_2/CO_2$ selectivity of about 20 at 150° C. H2 selective membrane 162 can be made of crosslinked polyimides, such as MATRIMID™ material (available from Huntsman). H2 selective membrane 162 can be made of thermally rearranged benzimidazoles (TR-PBI) and thermally rearranged benzoxazoles (TR-PBO).

H2 selective membrane 162 can be made of a material that can withstand high temperatures for extended periods of time, maintaining suitable operability over a wide temperature range. Suitable operability includes the ability to maintain permeability and selectivity within design parameters for the expected life of the membrane. The expected life of a membrane is typically about three years. H2 selective membrane 162 can be operable at temperatures between about 25° C. to about 300° C., alternately between about 100° C. to about 300° C. H2 selective membrane 162 can be operable at a temperature range of about 25° C. to about 250° C., alternately from about 50° C. to about 250° C., alternately from about 100° C. to about 250° C., or alternately from about 150° C. to about 300° C. Advantageously, H2 selective membrane 162 has suitable operability over a wide temperature range, which allows for the separation to occur at high temperatures, requiring less cooling of the gas streams feeding the membrane unit.

H2 rich stream 178 is generated from H2 selective membrane unit 160. H2 rich stream 178 has a higher concentration of $H_2$ than what was present in tail gas stream 135 or quench tower overhead stream 148. H2 rich stream 178 can have a concentration of $H_2$ of great than about 20 mol %, alternately greater than about 30 mol %, alternately greater than about 35 mol %, or alternately greater than about 40 mol %. H2 rich stream 178 can have a concentration of $H_2S$ in the range of about 50 ppmv to about 5 mol %, alternately about 200 ppmv to about 4 mol %, alternately about 1000 ppmv to about 3.5 mol %, or alternately about 0.1 mol % to about 3.0 mol %. H2 rich stream 178 can also include a $CO_2$ concentration in the range of about 5 mol % to about 35 mol %, or alternately about 10 mol % to about 30 mol %. H2 rich stream 178 can also include an $N_2$ concentration of about 20 mol % to about 60 mol %, or alternately about 25 mol % to about 50 mol %.

H2 rich stream 178 can be at a pressure less than about 5 psia, or alternately less than about 2 psia. In some embodiments, H2 rich stream 178 can have a temperature of at least 50° C., alternately 60° C. H2 rich stream 178 can have a temperature in the range of about 25° C. to about 350° C., alternately about 100° C. to about 300° C., alternately about 25° C. to about 250° C., alternately about 50° C. to about 250° C., alternately about 100° C. to about 250° C., or alternately about 150° C. to about 300° C.

H2S rich recycle 188 is generated from H2S removal unit 180. H2S rich recycle 188 has a higher concentration of $H_2S$ than what was present in tail gas stream 135 or quench tower overhead stream 148. H2S rich recycle 188 can be recycled to sulfur recovery unit 110. H2S rich recycle 188 can have an $H_2S$ concentration of greater than about 20 mol %, alternately greater than about 35 mol %, alternately greater than about 45 mol %, alternately greater than about 50 mol %. H2S rich recycle 188 can have a $CO_2$ concentration of greater than about 10 mol %, or alternately greater than about 20 mol %. H2S rich recycle 188 can have a pressure of about 29 psia.

Overhead stream treatment process 150 also generates the H2 lean stream (not pictured) and the H2S lean stream (not pictured). The H2 lean stream (not pictured) can be fully utilized within overhead stream treatment process 150. The H2S lean stream (not pictured) can be fully utilized within overhead stream treatment process 150. The H2 lean stream (not pictured) has a lower concentration of $H_2$ than H2 rich stream 178. The H2S lean stream (not pictured) has a lower concentration of H2S than H2S rich recycle 188. The pressures of the streams in overhead stream treatment process 150 can vary between 1 psig to 40 psig. Pressure can be increased using compressors.

Figure 2:
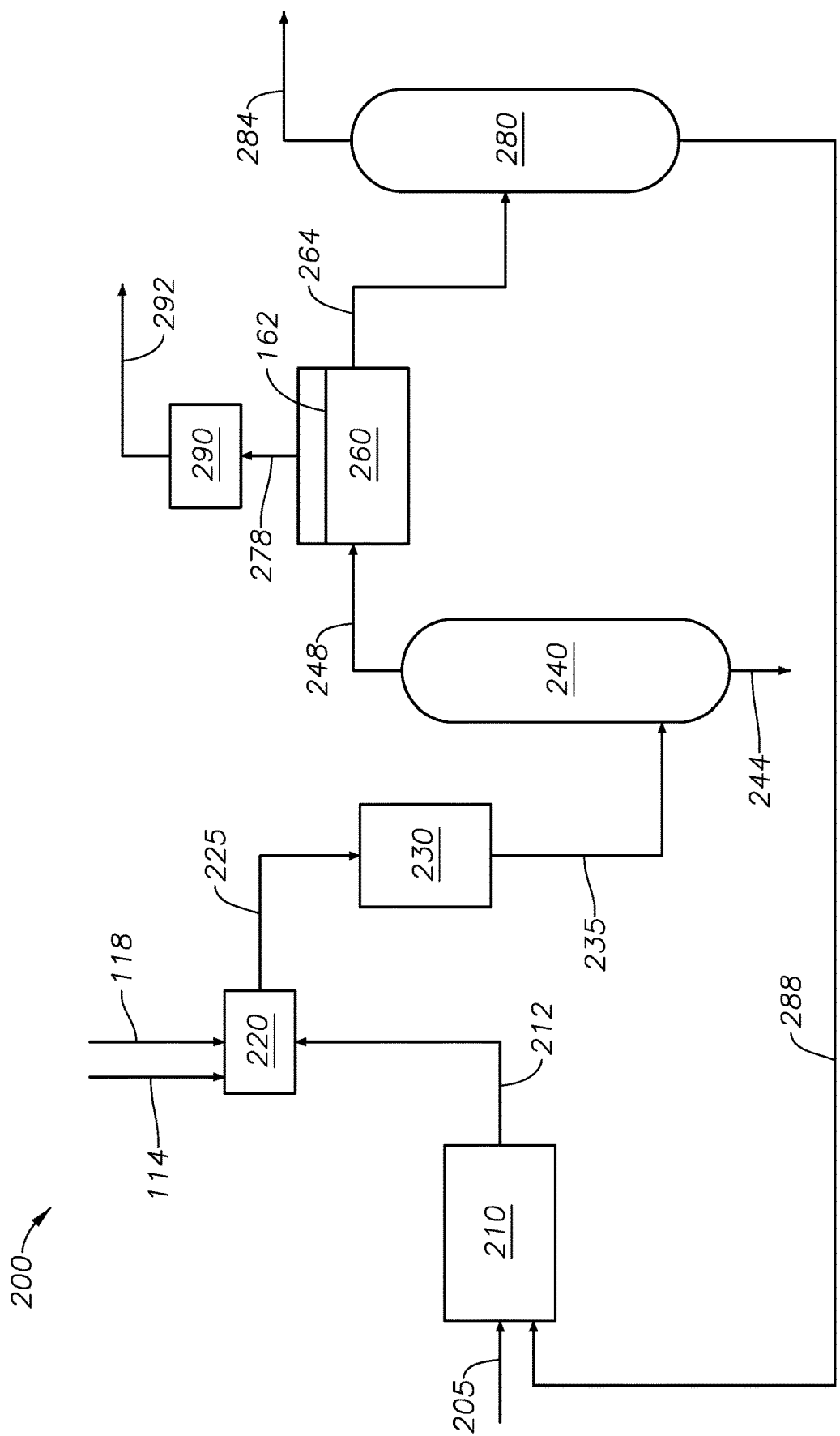
FIG. 2 is a block diagram of a tail gas treating system with membrane treatment before an absorber, in accordance with another embodiment.

Returning now to the figures, FIG. 2 shows a block diagram of tail gas treating system with the membrane treatment before absorber 200 according to one or more embodiments described in this disclosure. The setup of tail gas treating system with the membrane treatment before absorber 200 can be used to generate a greener sales gas with an increased $H_2$ content by recycling the $H_2$ rich permeate stream from the membrane processes to the plant inlet gas. Advantageously, tail gas treating system with the membrane treatment before absorber 200 can utilize an $H_2$ selective membrane that can handle higher temperatures, allow for less cooling in the quench tower or quench tower partial bypass. Acid gas stream 205 is introduced to sulfur recovery unit 210. Acid gas stream 205 can have the same characteristics, composition, and operating conditions as acid gas stream 105. Sulfur recovery unit 210 can have the same characteristics, composition, and operating conditions as sulfur recovery unit 110.

Sulfur recovery unit 210 can generate sulfur recovery unit waste stream 212. Sulfur recovery unit waste stream 212 can have the same characteristics, composition, and operating conditions as sulfur recovery unit waste stream 112. Sulfur recovery unit waste stream 212 is introduced to tail gas treatment reheater 220. Tail gas treatment reheater 220 can have the same characteristics and operating conditions as tail gas treatment reheater 120. Fuel gas stream 114 is also introduced to tail gas treatment reheater 220. Air stream 118 is also introduced to tail gas treatment reheater 220. Heated sulfur recovery unit waste stream 225 is generated from tail gas treatment reheater 220, and can have the same characteristics, composition, and operating conditions as heated sulfur recovery unit waste stream 125. Heated sulfur recovery unit waste stream 225 is introduced to tail gas treatment reactor 230. Tail gas treatment reactor 230 can have the same characteristics and operating conditions as tail gas treatment reactor 130. Tail gas treatment reactor 230 generates tail gas stream 235, which can have the same characteristics, composition, and operating conditions as tail gas stream 135.

Tail gas stream 235 is introduced to quench tower 240, which can have the same characteristics and operating conditions as quench tower 140. In an embodiment, quench tower 240 is sized and operated so that quench tower overhead stream 248 is at an acceptable temperature for H2 selective membrane 262 housed inside H2 selective membrane unit 260. In an embodiment, H2 selective membrane 262 can handle higher temperature gas streams from 150° C. to 300° C., so that quench tower 240 is operated so that less cooling is required than if a traditional membrane was used. Quench tower 240 can therefore be operated at a lighter load than if a traditional membrane was used, or if the quench towner overhead streams were sent directly to an amine absorption unit.

Quench tower 240 generates the sour water stream 244, which can have the same characteristics, composition, and operating conditions as the sour water stream 144. In some embodiments, where quench tower 240 is operated so that less cooling is required than if a traditional membrane was used, the sour water stream 244 has a lesser flowrate than the sour water stream 144.

Quench tower 240 also generates quench tower overhead stream 248, which can have the same characteristics, composition, and operating conditions as quench tower overhead stream 148. Quench tower overhead stream 248 is saturated with water vapor. The $H_2S$ concentration in quench tower overhead stream 248 can be in the range of about 0.5 mol % to about 5.0 mol %, alternately about 1.0 mol % to about 3.0 mol %, alternately about 0.5 mol % to about 4.0 mol %, or alternately about 1.0 mol % to about 2.5 mol %. The $CO_2$ concentration of quench tower overhead stream 248 can be in the range of about 10 mol % to about 50 mol %, alternately about 20 mol % to about 40 mol %, or alternately about 25 mol % to about 35 mol %. The $N_2$ concentration of quench tower overhead stream 248 can be in the range of about 25 mol % to about 80 mol %, alternately about 40 mol % to about 75 mol %, or alternately about 50 mol % to about 65 mol %. The $H_2$ concentration in quench tower overhead stream 248 can be in the range of about 0.5 mol % to about 5 mol %, alternately about 1 mol % to about 3 mol %, or alternately about 1.5 mol % to about 2.5 mol %.

Quench tower overhead stream 248 is introduced to H2 selective membrane unit 260. H2 selective membrane unit 260 can have the same characteristics and operating conditions as H2 selective membrane unit 160. In some embodiments, H2 selective membrane unit 160 is designed to handle a higher gas stream temperature. H2 selective membrane unit 260 includes H2 selective membrane 162. H2 selective membrane 162 can have the same composition, characteristics, and operating parameters as previously disclosed. H2 selective membrane unit 260 treats quench tower overhead stream 248 which contains $H_2S$.

Quench tower overhead stream 248 is introduced to the retentate side of H2 selective membrane 162, allowing $H_2$ present in quench tower overhead stream 248 to permeate through H2 selective membrane 162. H2 rich stream 278 is generated from the permeate of H2 selective membrane 162.

H2 rich stream 278 can have a temperature of at least 50° C., alternately 60° C. $H_2$ rich stream 278 can have a temperature in the range of about 25° C. to about 350° C., alternately about 100° C. to about 300° C., alternately 25° C. to about 250° C., alternately about 50° C. to about 250° C., alternately about 100° C. to about 250° C., or alternately about 150° C. to about 300° C. H2 rich stream 278 can be at a pressure less than about 5 psia, or alternately less than about 2 psia.

H2 rich stream 278 has a higher concentration of $H_2$ than what is present in quench tower overhead stream 248. H2 rich stream 278 is removed from the permeate side of H2 selective membrane unit 260. H2 rich stream 278 can have concentrations of $H_2$ of at least about 20 mol %, or alternately at least about 30 mol %, or alternately at least about 40 mol %.

Although H2 selective membrane 162 is selective for $H_2$ over $H_2S$, some $H_2S$ can permeate through H2 selective membrane 162. Therefore, H2 rich stream 278 includes some $H_2S$. H2 rich stream 278 can have a concentration of $H_2S$ in the range of 0.1 mol % to about 3 mol %, alternately about 0.5 mol % to about 2 mol %, or alternately about 0.75 mol % to about 1.5 mol %. Additionally, some $CO_2$ and $N_2$ can permeate H2 selective membrane 162 and be present in H2 rich stream 278. The $CO_2$ concentration of H2 rich stream 278 can be in the range of about 5 mol % to about 35 mol %, or alternately about 10 mol % to about 20 mol %. The $N_2$ concentration of H2 rich stream 278 can be in the range of about 20 mol % to about 60 mol %, or alternately about 30 mol % to about 40 mol %.

H2 rich stream 278 is introduced to plant compressor 290. Plant compressor 290 can be any type of pump, compressor, or other piece of equipment that can provide a driving force that can propel a gas stream. H2 rich stream 278, having been generated from the permeate of H2 selective membrane 162, has a low pressure and therefore can require a compressor to be utilized in processes or to travel distances. In an embodiment, plant compressor 290 is a reciprocating compressor.

Plant compressor 290 can provide a source of vacuum, which increases the permeation and efficiency of H2 selective membrane 162 while minimizing the stage cut. In some embodiments, plant compressor 290 provides a source of vacuum such that H2 rich stream 278 is as a pressure below atmospheric pressure. Plant compressor 290 generates plant recycle 292, which can contain $H_2$ and $H_2S$. Plant compressor 290 can provide any level of compression, and increase the pressure of plant recycle 292 to any pressure. In some embodiments, plant recycle 292 has a pressure greater than 30 psig. In some embodiments, plant recycle 292 has a pressure less than 1000 psig In some embodiments, plant recycle 292 is recycled to the natural gas treatment plant inlet for treatment in an acid gas removal system. The acid gas removal system can remove the $H_2S$, and the $H_2$ will travel through the natural gas treatment plant with the hydrocarbons, resulting in the final treated natural gas streams have a higher $H_2$ content than what would have occurred without plant recycle 292. The higher $H_2$ content results in a cleaner burning natural gas, or a "greener gas" that emits fewer pollutants and less greenhouse gasses, and is therefore more environmentally friendly. The $H_2$ can also be removed from plant recycle 292 and used throughout the refinery to prevent catalyst deactivation or used for a cold start of a sulfur recovery plant. The remaining gas can be used for blanketing or purging gas.

H2 lean stream 264 is removed as the retentate from H2 selective membrane unit 260. H2 lean stream 264 has a lower concentration of $H_2$ than H2 rich stream 278. The $H_2$ concentration in H2 lean stream 264 can be in the range of about 0.1 mol % to about 2 mol %, alternately about 0.1 mol % to about 1 mol %, or alternately about 0.2 mol % to about 0.5 mol %. H2 lean stream 264 can have an $H_2S$ concentration in the range of about 0.5 mol % to about 5 mol %, or alternately about 1 mol % to about 3 mol %. The $CO_2$ concentration in H2 lean stream 264 can be in the range of about 10 mol % to about 50 mol %, or alternately about 20 mol % to about 40 mol %. The $N_2$ concentration in H2 lean stream 264 can be about 40 mol % to about 80 mol %, alternately about 50 mol % to about 75 mol %, or alternately about 60 mol % to about 70 mol %.

H2 lean stream 264 is introduced to H2S removal unit 280. H2S removal unit 280 can have all of the same characteristics and operating conditions as H2S removal unit 180. H2S removal unit 280 can be sized or operated to handle less $H_2S$ than if the H2 selective membrane is located after the $H_2S$ removal unit.

H2S removal unit 280 generates an H2S rich recycle 288. H2S rich recycle 288 can be recycled from H2S removal unit 280 to sulfur recovery unit 210. H2S rich recycle 288 has a higher concentration of $H_2S$ than H2 lean stream 264. H2S rich recycle 288 can have an $H_2S$ concentration of greater than about 20 mol %, alternately greater than about 35 mol %, alternately greater than about 45 mol %, alternately greater than about 50 mol %. H2S rich recycle 288 can have a $CO_2$ concentration of greater than about 10 mol %, or alternately greater than about 20 mol %. H2S removal unit 280 can be an amine unit operating at typical operating conditions. H2 lean stream 264 can have a temperature of around 100° F.

H2S removal unit 280 generates H2S lean stream 284. H2S lean stream 284 has a lower concentration of $H_2S$ than H2S rich recycle 288. H2S lean stream 284 can have an $H_2S$ concentration less than 500 ppmv, alternately less than 250 ppmv, alternately less than 175 ppmv, alternately less than 150 ppmv, alternately less than 125 ppmv, or alternately less than 100 ppmv. H2S lean stream 284 can be sent to an incineration device for disposal, released to atmosphere, or sent to another area of the plant for recycle or use.

Advantageously, the layout in FIG. 2 and the tail gas treating system with membrane treatment before absorption can be retrofitted to an existing system. In some embodiments, where H2 selective membrane 262 can handle higher temperature gas streams from 150° C. to 300° C., quench tower 240 is smaller to allow for less cooling as compared to the amount of cooling required for a membrane that cannot handle higher temperature gas streams. Additionally, in some embodiments, plant recycle 292 is recycled to the plant inlet or to fuel gas lines to generate a cleaner burning fuel or sales gas. Other advantages of tail gas treating system with the membrane treatment before absorber 200 include a reduction the amount of water vapor in H2 lean stream 264 going to H2S removal unit 280, since water vapor permeates the $H_2$ selective membranes, resulting in less amine dilution. Additionally, H2S removal unit 280 can operate at a higher pressure, which results in the ability to reduce the size of H2S removal unit 280.

Figure 3:
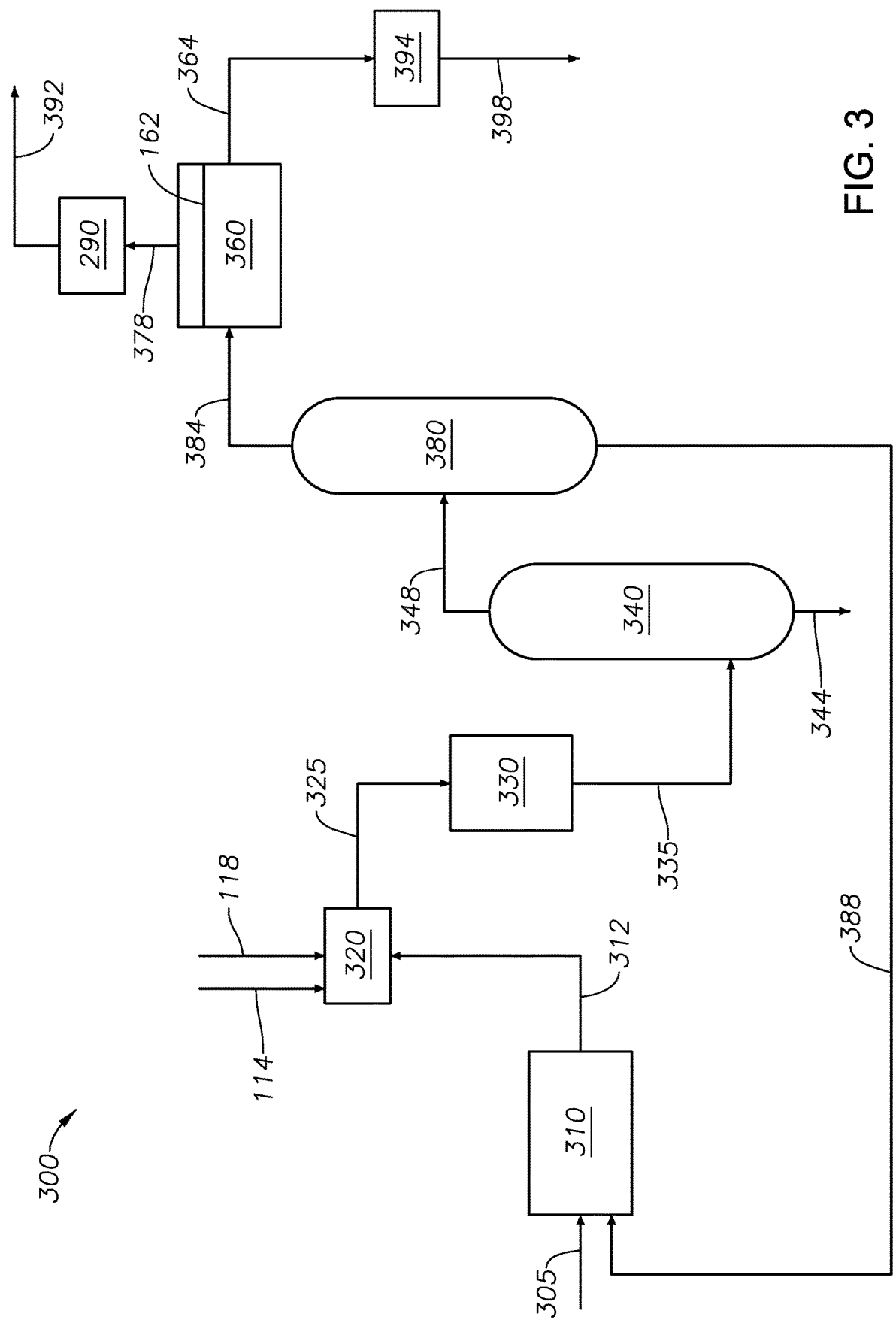
FIG. 3 is a block diagram of a tail gas treating system with membrane treatment after an absorber, in accordance with another embodiment.

Referring now to FIG. 3, a block diagram of tail gas treating system with membrane treatment after absorber 300 is shown, according to one or more embodiments described in this disclosure. Acid gas stream 305 is introduced to sulfur recovery unit 310. Acid gas stream 305 can have the same characteristics, composition, and operating conditions as acid gas stream 105. Sulfur recovery unit 310 can have the same characteristics, composition, and operating conditions as sulfur recovery unit 110. Tail gas treating system with membrane treatment after absorber 300 is advantageous when there are sulfur levels in acid gas stream 305 are low.

Sulfur recovery unit 310 can generate sulfur recovery unit waste stream 312. Sulfur recovery unit waste stream 312 can have the same characteristics, composition, and operating conditions as sulfur recovery unit waste stream 112. Sulfur recovery unit waste stream 312 is introduced to tail gas treatment reheater 320. Tail gas treatment reheater 320 can have the same characteristics and operating conditions as tail gas treatment reheater 120. Fuel gas stream 114 is introduced to tail gas treatment reheater 320. Air stream 118 is introduced to tail gas treatment reheater 320.

Heated sulfur recovery unit waste stream 325 can be generated from tail gas treatment reheater 320, and can have the same characteristics, composition, and operating conditions as heated sulfur recovery unit waste stream 125. Heated sulfur recovery unit waste stream 325 can be introduced to tail gas treatment reactor 330. Tail gas treatment reactor 330 can have the same characteristics and operating conditions as tail gas treatment reactor 130. Tail gas treatment reactor 330 can generate tail gas stream 335, which can have the same characteristics, composition, and operating conditions as tail gas stream 135.

Tail gas stream 335 is introduced to quench tower 340, which can have the same characteristics and operating conditions as quench tower 140. In some embodiments, quench tower 340 is sized and operated so that quench tower overhead stream 348 is at an acceptable temperature to maximize operational efficiency for H2S removal unit 380. Quench tower 340 can be operated so that less cooling is required since quench tower overhead stream 348 is being directed to H2S removal unit 380, and H2S removal unit 380 can handle higher temperatures as compared to a conventional membrane.

Quench tower 340 generates the sour water stream 344 which can have the same characteristics, composition, and operating conditions as the sour water stream 144. In some embodiments, where quench tower 340 is operated so that less cooling is required than if a membrane was placed before H2S removal unit 380, the sour water stream 344 has a lesser flowrate than the sour water stream 144.

Quench tower 340 generates quench tower overhead stream 348, which can have the same characteristics, composition, and operating conditions as quench tower overhead stream 148. The $H_2S$ concentration in quench tower overhead stream 348 can be in the range of about 1.0 mol % to about 3.0 mol %, alternately about 0.5 mol % to about 5.0 mol %, or alternately about 0.5 mol % to about 4.0 mol %, or alternately about 1.0 mol % to about 2.5 mol %.

Quench tower overhead stream 348 is introduced to H2S removal unit 380. H2S removal unit 380 can have the same characteristics and operating conditions as H2S removal unit 180. H2S removal unit 380 can be any type of unit that can selectively absorb $H_2S$ over $CO_2$. H2S removal unit 380 can have the same characteristics and operating conditions as H2S removal unit 180. H2S removal unit 380 generates the H2S rich stream 388, which can have the same characteristics, composition, and operational conditions as the H2S rich stream 188. H2S rich stream 388 can be recycled to can be recycled to sulfur recovery unit 310. H2S removal unit 380 can be sized based on the purity desired for H2 rich stream 378.

In some embodiments, H2 selective membrane 362 cannot handle higher temperature gas streams above 200° C.; therefore, H2 selective membrane unit 360 is placed after H2S removal unit 380 such that the temperature of H2S lean stream 384 is at a low enough temperature to not affect the operating conditions of H2 selective membrane unit 360. H2S lean stream 384 can have an $H_2S$ concentration of less than about 500 ppmv, alternately less than about 350 ppmv, alternately less than about 250 ppmv, alternately less than about 175 ppmv, alternately less than about 150 ppmv, alternately less than about 125 ppmv, or alternately less than about 100 ppmv. In some embodiments, H2 selective membrane unit 360 treats H2S lean stream 384 which contains $H_2S$ in very low concentrations. The $CO_2$ concentration of H2S lean stream 384 can be in the range of about 10 mol % to about 50 mol %, alternately about 15 mol % to about 45 mol %, or alternately about 25 mol % to about 35 mol %. The $N_2$ concentration of H2S lean stream 384 can be in the range of about 25 mol % to 90 mol %, alternately about 40 mol % to about 80 mol %, or alternately about 50 mol % to about 70 mol %. The $H_2$ concentration of H2S lean stream 384 can be in the range of about 0.5 mol % to about 5 mol %, alternately about 1 mol % to about 4 mol %, or alternately about 1.5 mol % to about 2.5 mol %.

H2S lean stream 384 is introduced to H2 selective membrane unit 360. H2 selective membrane unit 360 can have the same characteristics and operating conditions as H2 selective membrane unit 160. H2 selective membrane unit 360 includes H2 selective membrane 162. H2 selective membrane 162 can have the same composition, characteristics and operating parameters as previously disclosed herein.

H2S lean stream 384 is introduced to the retentate side of H2 selective membrane 162, allowing $H_2$ present in H2S lean stream 384 to permeate through H2 selective membrane 162. H2 rich stream 378 is generated by the permeate of H2 selective membrane 162. H2 rich stream 378 has a higher concentration of $H_2$ than what is present in H2S lean stream 384. $H_2$ rich stream 378 is removed from H2 selective membrane unit 360. In an embodiment, H2 rich stream 378 is at a pressure less than about 5 psia, or alternately less than about 2 psia. H2 rich stream 378 can have a temperature of at least 50° C. H2 rich stream 378 can have a temperature in the range of about 25° C. to about 350° C., alternately about 100° C. to about 300° C., alternately about 25° C. to about 250° C., alternately about 50° C. to about 250° C., alternately about 100° C. to about 250° C., or alternately about 150° C. to about 300° C.

H2 rich stream 378 can have concentrations of $H_2$ of at least about 20 mol %, or alternately at least about 40 mol %, or alternately at least about 50 mol %. Although H2 selective membrane 162 is selective for $H_2$ over $H_2S$, some $H_2S$ can permeate through H2 selective membrane 162. Therefore, H2 rich stream 378 can contain some $H_2S$. H2 rich stream 378 can have an $H_2S$ concentration less than about 120 ppmv, or alternately less than about 100 ppmv, or alternately less than about 75 ppmv. Additionally, some $CO_2$ and $N_2$ can permeate H2 selective membrane 162 and be present in H2 rich stream 378. H2 rich stream 378 can have a $CO_2$ concentration in the range of about 10 mol % to 30 mol %, or alternately about 15 mol % to about 25 mol %. H2 rich stream 378 can have an $N_2$ concentration in the range of about 10 mol % to 50 mol %, alternately about 15 mol % to about 45 mol %, or alternately about 20 mol % to about 40 mol %.

H2 rich stream 378 is introduced to plant compressor 290. Plant compressor 290 can be any type of pump, compressor, or other driving force that can propel a gas stream. H2 rich stream 378, having been generated from the permeate of H2 selective membrane 162, has a low pressure and therefore requires a compressor to be utilized in processes or to travel distances.

In some embodiments, plant compressor 290 provides a source of a vacuum, which increases the permeation and efficiency of H2 selective membrane 162 while minimizing the stage cut. H2 rich stream 378 can be at a pressure less than about 5 psia, or alternately less than about 2 psia.

Plant compressor 290 generates plant recycle 392, which contains $H_2$. Plant recycle 392 can have the same composition as H2 rich stream 378. Plant recycle 392 can be recycled to the natural gas treatment plant fuel gas or the sales gas. Adding plant recycle 392 to the natural gas treatment plant fuel gas or sales gas results in a natural gas that has a higher $H_2$ content than would occur without plant recycle 392. The higher $H_2$ content results in a cleaner burning natural gas, or a "greener gas" that emits fewer pollutants and less greenhouse gasses. Typically, $H_2$ concentrations in plant gas can be in the range of about 0.5 mol % to about 3 mol %. Additionally, plant recycle 392 can be treated with water and $N_2$ removal to increase the purity of the $H_2$ in plant recycle 392 to generate a purified $H_2$ stream for sale.

H2 lean stream 364 is removed as the retentate from H2 selective membrane unit 360. H2 lean stream 364 has a lower concentration of $H_2$ than H2 rich stream 378. H2 lean stream 364 can have an $H_2$ concentration in the range of about 0.1 mol % to 2 mol %, or alternately 0.1 mol % to about 1 mol %. The $H_2S$ concentration of H2 lean stream 364 can be less than 500 ppmv, alternately less than 250 ppmv, or alternately less than 160 ppmv. The concentration of $CO_2$ in H2 lean stream 364 can be in the range of about 10 mol % to about 30 mol %, or alternately about 15 mol % to about 25 mol %. The concentration of $N_2$ in H2 lean stream 364 can be in the range of about 15 mol % to about 50 mol %, alternately about 20 mol % to about 40 mol %, or alternately about 30 mol % to about 40 mol %. H2 lean stream 364 can have a pressure of about 3 to about 4 psig.

H2 lean stream 364 is introduced to incinerator 394 so that any remaining $H_2S$, sulfur compounds, or hydrocarbons can be burned. Incinerator 394 produces an incinerator exhaust 398 which can contain $SO_2$ in quantities less than 150 ppmv, $CO_2$, and water vapor.

Advantages of tail gas treating system with membrane treatment after absorber 300 include removing $H_2S$ from the streams going to the membrane units, which allows for using non-sour metallurgy for any associated equipment. Removing $H_2S$ before treatment in H2 selective membrane unit 360 results in a clean $H_2$ stream, which can be treated to remove water, $CO_2$, and $N_2$ to generate a high-quality $H_2$ stream. Alternatively, the H2 rich stream 378 can be used in the fuel gas at the facility. Advantageously, when the membrane treatment is after acid gas treatment, H2S lean stream 384, the gas stream feed to the membrane units, lacks $SO_2$ and $H_2S$, which can potentially lengthen the life of the membrane.

Figure 4:
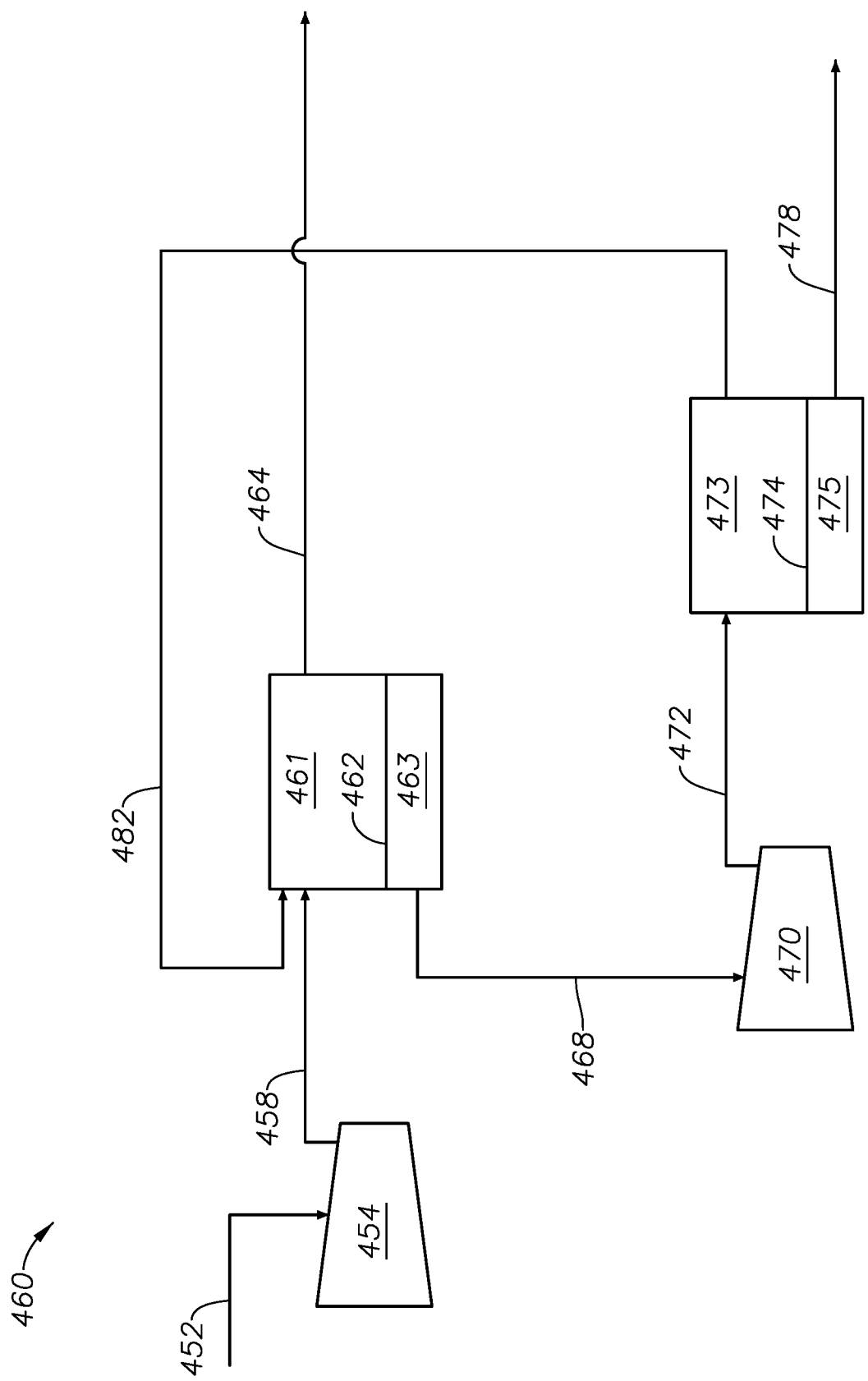
FIG. 4 is a block diagram of a membrane treatment process, in accordance with another embodiment.

Referring to FIG. 4, a block diagram of a membrane treatment process is shown, according to an embodiment. Membrane treatment unit 460 contains two or more membranes. H2 selective membrane unit 160, 260, and 360 can include membrane treatment unit 460. Membrane feed stream 452 is introduced to membrane treatment unit 460. In some embodiments, membrane feed stream 452 is quench tower overhead stream 248. In some embodiments, membrane feed stream 452 is H2S lean stream 384.

Membrane feed stream 452 is introduced to membrane feed compressor 454. Membrane feed compressor 454 can be any type of compressor capable of raising the pressure of membrane feed stream 452, including reciprocating, screw, or centrifugal compressors. Membrane feed compressor 454 generates compressed membrane feed stream 458. Compressed membrane feed stream 458 has a higher pressure than membrane feed stream 452. In an embodiment, compressed membrane feed stream 458 has a pressure greater than about 23 psia, alternately greater than about 30 psia, alternately greater than about 40 psia, or alternately greater than about 55 psia. Compressed membrane feed stream 458 can have a temperature in the range of about 25° C. to about 350° C., alternately about 100° C. to about 300° C., alternately about 25° C. to about 250° C., alternately about 50° C. to about 250° C., alternately about 100° C. to about 250° C., or alternately about 150° C. to about 300° C. Compressed membrane feed stream 458 can have the same composition as membrane feed stream 452.

Compressed membrane feed stream 458 is introduced to first H2 selective membrane retentate side 461 of first H2 selective membrane 462. First H2 selective membrane 462 can have the same characteristics, composition, and operating conditions as H2 selective membrane 162. $H_2$ preferentially permeates first H2 selective membrane 462. Other compounds can permeate first H2 selective membrane 462 to some extent.

H2 rich permeate 468 is removed from first H2 selective membrane permeate side 463. In an embodiment, H2 rich permeate 468 is at a pressure less than about 5 psia, or alternately less than about 2 psia. H2 rich permeate 468 can have a temperature in the range of about 25° C. to about 350° C., alternately about 100° C. to about 300° C., alternately about 25° C. to about 250° C., alternately about 50° C. to about 250° C., alternately about 100° C. to about 250° C., or alternately about 150° C. to about 300° C.

H2 lean stream 464 is removed from first H2 selective membrane retentate side 461. In some embodiments, H2 lean stream 264 includes H2 lean stream 464. In some embodiments, H2 lean stream 364 includes H2 lean stream 464. In an embodiment, H2 lean stream 464 has a pressure greater than about 25 psia, alternately about 30 psia, alternately about 40 psia, or alternately about 55 psia. H2 lean stream 464 can have a temperature in the range of about 25° C. to about 350° C., alternately about 100° C. to about 300° C., alternately about 25° C. to about 250° C., alternately about 50° C. to about 250° C., alternately about 100° C. to about 250° C., or alternately about 150° C. to about 300° C.

H2 rich permeate 468 is introduced to permeate compressor 470. Permeate compressor 470 can be any type of compressor capable of raising the pressure of H2 rich permeate 468. Permeate compressor 470 generates second membrane feed stream 472. Second membrane feed stream 472 can have the same composition as H2 rich permeate 468. Second membrane feed stream 472 has a higher pressure than H2 rich permeate 468. Second membrane feed stream 472 can have a pressure greater than about 25 psia, alternately about 30 psia, alternately about 40 psia, or alternately about 55 psia. Second membrane feed stream 472 can have a temperature in the range of about 25° C. to about 350° C., alternately about 100° C. to about 300° C., alternately about 25° C. to about 250° C., alternately about 50° C. to about 250° C., alternately about 100° C. to about 250° C., or alternately about 150° C. to about 300° C.

Second membrane feed stream 472 is introduced to second H2 selective membrane retentate side 473 of second H2 selective membrane 474. Second H2 selective membrane 474 can have the same characteristics, composition, and operating conditions as H2 selective membrane 162. $H_2$ preferentially permeates second H2 selective membrane 474. Other compounds can permeate second H2 selective membrane 474 to some extent. H2 rich stream 478 is removed from second H2 selective membrane permeate side 475. In some embodiments, H2 rich stream 278 includes H2 rich stream 478. In some embodiments, H2 rich stream 378 includes H2 rich stream 478. H2 rich stream 478 can be at a pressure less than about 5 psia, or alternately less than about 2 psia. H2 rich stream 478 can have a temperature in the range of about 25° C. to about 350° C., alternately about 100° C. to about 300° C., alternately about 25° C. to about 250° C., alternately about 50° C. to about 250° C., alternately about 100° C. to about 250° C., or alternately about 150° C. to about 300° C.

Membrane recycle stream 482 is removed from second H2 selective membrane retentate side 473. Membrane recycle stream 482 can have a temperature in the range of about 25° C. to about 350° C., alternately about 100° C. to about 300° C., alternately about 25° C. to about 250° C., alternately about 50° C. to about 250° C., alternately about 100° C. to about 250° C., or alternately about 150° C. to about 300° C. Membrane recycle stream 482 can be at a pressure of greater than about 25 psia, alternately greater than about 30 psia, alternately greater than about 40 psia, or alternately greater than about 55 psia. Membrane recycle stream 482 is recycled to first H2 selective membrane retentate side 461 in order to improve efficiency of the $H_2$ recovery.

EXAMPLES

Computer simulations were performed to illustrate the operation and results of the processes disclosed herein. For the computer simulations, only one $H_2$ selective membrane was used in the H2 selective membrane unit. The temperature of all streams for all examples was 120° F.

The examples below illustrate the effect of changing $H_2S$ content, the impact of varying the order of the treatment of the quench tower overhead stream in either the H2 selective membrane unit or the $H_2S$ removal unit before the other, the pressure of the feed gas introduced to the $H_2$ selective membrane, and the membrane selectivity for $H_2$ over $CO_2$, $H_2S$, Ar, and $N_2$.

Example 1

In Example 1, a computer simulation was performed of H2 selective membrane unit 360 installed after H2S removal unit 380. FIG. 3 is a simplified depiction of the process layout used in the simulation. H2S lean stream 384 fed to H2 selective membrane unit 360 contained no more than 0.6 lbmol/hr $H_2S$ on a dry basis. The simulation used one $H_2$ selective membrane inside H2 selective membrane unit 360 with a selectivity for $H_2$ over $CO_2$, $H_2S$, Ar, and $N_2$ of 20. The feed pressure of H2S lean stream 384 to H2 selective membrane unit 360 was 43 psia, while the permeate pressure was 1 psia. Table 1 shows the results of Example 1.

TABLE 1

Material Balance Across $H_2$ Selective Membrane, Example 1

| Component | Stream Number | | |
|---|---|---|---|
| | 384 | 378 | 364 |
| | Pressure (psia) | | |
| (lbmol/hr; dry basis) | 43 | 1 | 41 |
| $H_2S$ | 0.6 | 0.02 | 0.58 |
| $CO_2$ | 1300.0 | 45.09 | 1254.91 |
| $N_2$ | 2589.4 | 89.81 | 2499.59 |
| $H_2$ | 80.0 | 63.47 | 16.53 |
| Ar | 30.0 | 1.04 | 28.96 |
| Total Molar Flow | 4000.0 | 199.43 | 3800.57 |

Example 2

In Example 2, a computer simulation was performed of H2 selective membrane unit 360 installed after H2S removal unit 380. FIG. 3 is a simplified depiction of the process layout used in the simulation. H2S lean stream 384 fed to H2 selective membrane unit 360 contained no more than 0.6 lbmol/hr $H_2S$ on a dry basis. The simulation used one $H_2$ selective membrane inside H2 selective membrane unit 360 with a selectivity for $H_2$ over $CO_2$, $H_2S$, Ar, and $N_2$ of 20. The feed pressure of H2S lean stream 384 to H2 selective membrane unit 360 was 58 psia while the permeate pressure was 1 psia. Table 2 shows the results of Example 2.

TABLE 2

Material Balance Across $H_2$ Selective Membrane, Example 2

| Component | Stream Number | | |
|---|---|---|---|
| | 384 | 378 | 364 |
| | Pressure (psia) | | |
| (lbmol/hr; dry basis) | 58 | 1 | 56 |
| $H_2S$ | 0.6 | 0.01 | 0.59 |
| $CO_2$ | 1300.0 | 29.84 | 1270.16 |
| $N_2$ | 2589.4 | 59.44 | 2529.96 |
| $H_2$ | 80.0 | 65.89 | 14.10 |
| Ar | 30.0 | 0.69 | 29.31 |
| Total Molar Flow | 4000.0 | 155.87 | 3844.12 |

Example 3

In Example 3, a computer simulation was performed of H2 selective membrane unit 360 installed after H2S removal unit 380. FIG. 3 is a simplified depiction of the process layout used in the simulation. H2S lean stream 384 fed to H2 selective membrane unit 360 contained no more than 0.6 lbmol/hr $H_2S$ on a dry basis. The simulation used one $H_2$ selective membrane inside H2 selective membrane unit 360 with a selectivity for $H_2$ over $CO_2$, $H_2S$, Ar, and $N_2$ of 40. The feed pressure of H2S lean stream 384 to H2 selective membrane unit 360 was 58 psia while the permeate pressure was 1 psia. Table 3 shows the results of Example 3.

TABLE 3

Material Balance Across $H_2$ Selective Membrane, Example 3

| Component | Stream Number | | |
|---|---|---|---|
| | 384 | 378 | 364 |
| | Pressure (psia) | | |
| (lbmol/hr; dry basis) | 58 | 1 | 56 |
| $H_2S$ | 0.6 | 0.01 | 0.59 |
| $CO_2$ | 1300.0 | 25.21 | 1274.79 |
| $N_2$ | 2589.4 | 50.21 | 2539.19 |
| $H_2$ | 80.0 | 69.07 | 10.93 |
| Ar | 30.0 | 0.58 | 29.42 |
| Total Molar Flow | 4000.0 | 145.08 | 3854.92 |

Example 4

In Example 4, a computer simulation was performed of H2 selective membrane unit 360 installed after H2S removal unit 380. FIG. 3 is a simplified depiction of the process layout used in the simulation. H2S lean stream 384 fed to H2 selective membrane unit 360 contained no more than 0.6 lbmol/hr $H_2S$ on a dry basis. The simulation used one $H_2$ selective membrane inside H2 selective membrane unit 360 with a selectivity for $H_2$ over $CO_2$, $H_2S$, Ar, and $N_2$ of 40. The feed pressure of H2S lean stream 384 to H2 selective membrane unit 360 was 43 psia while the permeate pressure was 1 psia. Table 4 shows the results of Example 4.

TABLE 4

Material Balance Across $H_2$ Selective Membrane, Example 4

| Component | Stream Number | | |
|---|---|---|---|
| | 384 | 378 | 364 |
| | Pressure (psia) | | |
| (lbmol/hr; dry basis) | 43 | 1 | 41 |
| $H_2S$ | 0.6 | 0.01 | 0.59 |
| $CO_2$ | 1300.0 | 22.56 | 1277.44 |
| $N_2$ | 2589.4 | 44.95 | 2544.45 |
| $H_2$ | 80.0 | 61.07 | 18.93 |
| Ar | 30.0 | 0.52 | 29.48 |
| Total Molar Flow | 4000.0 | 129.11 | 3870.89 |

Example 5

In Example 5, a computer simulation was performed of H2 selective membrane unit 360 installed after H2S removal unit 380. FIG. 3 is a simplified depiction of the process layout used in the simulation. H2S lean stream 384 fed to H2 selective membrane unit 360 contained no more than 0.6 lbmol/hr $H_2S$ on a dry basis. The simulation used one $H_2$ selective membrane inside H2 selective membrane unit 360 with a selectivity for $H_2$ over $CO_2$, $H_2S$, Ar, and $N_2$ of 40. The feed pressure of H2S lean stream 384 to H2 selective membrane unit 360 was 28 psia while the permeate pressure was 1 psia. Table 5 shows the results of Example 5.

TABLE 5

Material Balance Across $H_2$ Selective Membrane, Example 5

| Component | Stream Number | | |
|---|---|---|---|
| | 384 | 378 | 364 |
| | Pressure (psia) | | |
| (lbmol/hr; dry basis) | 28 | 1 | 26 |
| $H_2S$ | 0.6 | 0.01 | 0.59 |
| $CO_2$ | 1300.0 | 22.40 | 1277.60 |
| $N_2$ | 2589.4 | 44.61 | 2544.79 |
| $H_2$ | 80.0 | 49.82 | 30.18 |
| Ar | 30.0 | 0.52 | 29.48 |
| Total Molar Flow | 4000.0 | 117.36 | 3882.64 |

Example 6

In Example 6, a computer simulation was performed of H2 selective membrane unit 260 installed before H2S removal unit 280. FIG. 2 is a simplified depiction of the process layout used in the simulation. Quench tower overhead stream 248 fed to H2 selective membrane unit 260 contained 78.44 lbmol/hr $H_2S$ on a dry basis. The simulation used one $H_2$ selective membrane inside H2 selective membrane unit 260 with a selectivity for $H_2$ over $CO_2$, $H_2S$, Ar, and $N_2$ of 40. The feed pressure of quench tower overhead stream 248 to H2 selective membrane unit 260 was 30 psia while the permeate pressure was 1 psia. Table 6 shows the results of Example 6.

TABLE 6

Material Balance Across $H_2$ Selective Membrane, Example 6

| Component | Stream Number | | |
|---|---|---|---|
| | 248 | 278 | 264 |
| | Pressure (psia) | | |
| (lbmol/hr; dry basis) | 30 | 1 | 28 |
| $H_2S$ | 78.44 | 1.93 | 76.51 |
| $CO_2$ | 1274.70 | 31.35 | 1243.34 |
| $N_2$ | 2539.00 | 62.45 | 2476.55 |
| $H_2$ | 78.44 | 62.95 | 15.50 |
| Ar | 29.42 | 0.72 | 28.69 |
| Total Molar Flow | 4000.0 | 159.40 | 3840.59 |

Example 7

In Example 7, a computer simulation was performed of H2 selective membrane unit 260 installed before H2S removal unit 280. FIG. 2 is a simplified depiction of the process layout used in the simulation. Quench tower overhead stream 248 fed to H2 selective membrane unit 260 contained 78.44 lbmol/hr $H_2S$ on a dry basis. The simulation used one $H_2$ selective membrane inside H2 selective membrane unit 260 with a selectivity for $H_2$ over $CO_2$, $H_2S$, Ar, and $N_2$ of 40. The feed pressure of quench tower overhead stream 248 to H2 selective membrane unit 160 was 45 psia while the permeate pressure was 1 psia. Table 7 shows the results of Example 7.

TABLE 7

Material Balance Across $H_2$ Selective Membrane, Example 7

| Component | Stream Number | | |
|---|---|---|---|
| | 248 | 278 | 264 |
| | Pressure (psia) | | |
| (lbmol/hr; dry basis) | 45 | 1 | 43 |
| $H_2S$ | 78.44 | 1.36 | 77.09 |
| $CO_2$ | 1274.70 | 22.06 | 1252.63 |
| $N_2$ | 2539.00 | 43.95 | 2495.05 |
| $H_2$ | 78.44 | 67.60 | 10.84 |
| Ar | 29.42 | 0.51 | 28.91 |
| Total Molar Flow | 4000.0 | 135.48 | 3864.52 |

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

Ranges may be expressed throughout as from about one particular value, or to about another particular value. When such a range is expressed, it is to be understood that another embodiment is from the one particular value or to the other particular value, along with all combinations within said range.

What is claimed is:

1. A method of treating tail gas generated from a sulfur recovery operation to generate hydrogen gas or a greener natural gas, the method comprising the steps of:
    providing an acid gas stream to a sulfur recovery unit, the acid gas stream comprising carbon dioxide and hydrogen sulfide;
    removing sulfur from the acid gas stream via the sulfur recovery unit to generate a sulfur recovery unit waste stream;
    heating the sulfur recovery unit waste stream with a tail gas treatment reheater to create a heated sulfur recovery unit waste stream;
    reacting the heated sulfur recovery unit waste stream in a tail gas treatment reactor operable to reduce sulfur compounds into hydrogen sulfide such that a tail gas stream is generated, wherein the tail gas stream comprises hydrogen, carbon dioxide, nitrogen, and hydrogen sulfide;
    cooling the tail gas stream in a quench tower to generate a quench tower overhead stream;
    treating the quench tower overhead stream in an overhead stream treatment process, the overhead stream treatment process comprising an H2 selective membrane unit and an H2S removal unit, to generate an H2S rich recycle, an H2S lean stream, an H2 rich stream, and an H2 lean stream, such that the H2S rich recycle comprises a higher concentration of hydrogen sulfide than the concentration of hydrogen sulfide in the H2S lean stream and the H2 rich stream comprises a higher concentration of hydrogen than the concentration of hydrogen gas in the H2 lean stream, and further wherein the H2 rich stream is generated in the H2 selective membrane unit and the H2S rich recycle is generated from the H2S removal unit, and further wherein the H2 selective membrane unit comprises an H2 selective membrane; and
    recycling the H2S rich recycle to the sulfur recovery unit.

2. The method of claim 1, wherein the H2 selective membrane has a selectivity of hydrogen over carbon dioxide of at least 20.

3. The method of claim 1, wherein the H2 selective membrane is operable at a temperature range of between 100° C. and 300° C.

4. The method of claim 3, wherein the H2 selective membrane comprises a glassy polymer operable to function at an operating temperature of 100° C. to 300° C. without degradation.

5. The method of claim 4, wherein the H2 selective membrane comprises a PBI polymer.

6. The method of claim 4, wherein the H2 selective membrane comprises a PBI type polymer, wherein the PBI type polymer comprises a compound selected from the group consisting of: a hexaluoroisopropylidene functional group, a PBI polymer derived from tetra amino diphenyl sulfone, a PBI polymer derived from tetra amino diphenyl sulfone polymers, a PBI polymer derived from tetra amino diphenyl sulfone copolymers, an N-substitution modified PBI, a PBI and melamine-co-formaldehyde thermosets blend, a Pd/PBI-HFA composite, and combinations of the same.

7. The method of claim 5, wherein the H2 selective membrane further comprises Pd.

8. The method of claim 7, wherein the H2 selective membrane further comprises HFA.

9. The method of claim 2, wherein the H2 selective membrane comprises an aromatic polyamide layer formed on a porous support layer, and a coating comprising a glassy polymer formed on the aromatic polyamide layer, wherein the glassy polymer has a glass transition temperature greater than 50° C.

10. The method of claim 4, wherein the glassy polymer comprises a monomer, copolymer, block copolymer, terpolymer, block terpolymer, or any molecular structure generated by a combination of compounds selected from the group of compounds comprising: polyimide, polybenzimidazole, polyphenylsulfone, polyamide, polysulfone, polyphenyl ether, cellulose nitrate, cellulose diacetate, cellulose triacetate, poly(vinyl alcohol), poly(phenylene sulfide), poly(vinyl chloride), polystyrene, poly(methyl methacrylate), polyacrylonitrile, polytetrafluoroethylene, polyetheretherketone, polycarbonate, polyvinyltrimethylsilane, polytrimethylsilylpropyne, poly(ether imide), poly(ether sulfone), polyoxadiazole, poly(phenylene oxide), and combinations thereof.

11. The method of claim 1, wherein the step of treating the quench tower overhead stream in the H2 selective membrane unit and the H2S removal unit further comprises the steps of:
    introducing the quench tower overhead stream to the H2 selective membrane unit before treatment in the H2S removal unit, such that the hydrogen gas is separated from the quench tower overhead stream before hydrogen sulfide is removed;
    generating the H2 lean stream from the H2 selective membrane unit; and
    then introducing the H2 lean stream to the H2S removal unit, such that the H2S removal unit produces the H2S rich stream and the H2S lean stream.

12. The method of claim 11, wherein the quench tower overhead stream comprises at least 2 mol % hydrogen sulfide.

13. The method of claim 11, further comprising the steps of:
    compressing the H2 rich stream in a plant compressor to generate a plant recycle; and
    recycling the plant recycle to a plant inlet for acid gas removal, such that processed natural gas from the plant inlet has an increased hydrogen content.

14. The method of claim 11, wherein the H2 selective membrane unit comprises a membrane feed compressor, a first H2 selective membrane, a permeate compressor, and a second H2 selective membrane, and further comprising the steps of:
    compressing the quench tower overhead stream in the membrane feed compressor to generate a compressed membrane feed stream;
    introducing the compressed membrane feed stream to the first H2 selective membrane, the first H2 selective membrane having a first H2 selective membrane permeate side and a first H2 selective membrane retentate side;
    allowing hydrogen to permeate the first H2 selective membrane to generate an H2 rich permeate;
    removing the H2 rich permeate from the first H2 selective membrane permeate side;
    removing the H2 lean stream from the first H2 selective membrane retentate side;
    compressing the H2 rich permeate in the permeate compressor to generate a second membrane feed stream;
    introducing the second membrane feed stream to the second H2 selective membrane, the second H2 selective membrane having a second H2 selective membrane retentate side and a second H2 selective membrane permeate side;

allowing hydrogen to permeate the second H2 selective membrane to generate the H2 rich stream from the second H2 selective membrane permeate side;

removing a membrane recycle stream from the second H2 selective membrane retentate side; and recycling the membrane recycle stream to the first H2 selective membrane retentate side.

15. The method of claim 1, wherein the step of treating the quench tower overhead stream in the H2 selective membrane unit and the H2S removal unit further comprises the steps of:

introducing the quench tower overhead stream to the H2S removal unit before treatment in the H2 selective membrane unit, such that hydrogen sulfide is removed from the quench tower overhead stream before hydrogen is removed from the quench tower overhead stream;

generating an H2S lean stream from the H2S removal unit; and then introducing the H2S lean stream to the H2 selective membrane unit.

16. The method of claim 15, wherein the H2S lean stream comprises less than 150 ppm hydrogen sulfide.

17. The method of claim 15, further comprising the step of incinerating the H2 lean stream in an incinerator.

18. The method of claim 15, wherein the H2 rich stream is further processed to remove water, carbon dioxide, and nitrogen to produce a hydrogen stream.

19. The method of claim 15, wherein the H2 rich stream is added to plant fuel gas.

20. The method of claim 15, wherein the H2 selective membrane unit comprises a membrane feed compressor, a first H2 selective membrane, a permeate compressor, and a second H2 selective membrane, and further comprising the steps of:

compressing the H2S lean stream in the membrane feed compressor to generate a compressed membrane feed stream;

introducing the compressed membrane feed stream to the first H2 selective membrane, the first H2 selective membrane comprising a first H2 selective membrane retentate side and a first H2 selective membrane permeate side;

allowing hydrogen to permeate the first H2 selective membrane to generate an H2 rich permeate;

removing the H2 rich permeate from the first H2 selective membrane permeate side;

removing the H2 lean stream from the first H2 selective membrane retentate side;

compressing the H2 rich permeate in the permeate compressor to generate a second membrane feed stream;

introducing the second membrane feed stream to the second H2 selective membrane, the second H2 selective membrane comprising a second H2 selective membrane retentate side and a second H2 selective membrane permeate side;

allowing hydrogen to permeate the second H2 selective membrane to generate the H2 rich stream from the second H2 selective membrane permeate side;

removing a membrane recycle stream from the second H2 selective membrane retentate side; and recycling the membrane recycle stream to the first H2 selective membrane retentate side.

21. A system for treating an acid gas contaminated stream to control emissions, generate hydrogen gas, or generate a greener natural gas, the system comprising:

a sulfur recovery unit, operable to convert sulfur compounds in an acid gas stream to elemental sulfur and further to generate a sulfur recovery unit waste stream;

a tail gas treatment reheater fluidically connected to the sulfur recovery unit, operable to heat the sulfur recovery unit waste stream to create a heated sulfur recovery unit waste stream;

a tail gas treatment reactor fluidically connected to the tail gas treatment reheater, operable to reduce sulfur compounds in the heated sulfur recovery unit waste stream to hydrogen sulfide, to generate a tail gas stream;

a quench tower fluidically connected to the tail gas treatment reactor, operable to reduce the temperature of the tail gas stream, to generate a sour water stream and a quench tower overhead stream;

an H2 selective membrane unit fluidically connected to the quench tower, comprising an H2 selective membrane, operable to selectively remove hydrogen from the quench tower overhead stream through the H2 selective membrane to generate an H2 rich stream and an H2 lean stream; and an H2S removal unit fluidically connected to the H2 selective membrane unit, operable to absorb hydrogen sulfide from the H2 lean stream with a solvent and configured to regenerate the solvent, to generate an H2S lean stream and an H2S rich recycle.

22. The system of claim 21, wherein the H2 selective membrane unit further comprises:

a membrane feed compressor, operable to compress the heated sulfur recovery unit waste stream, to generate a compressed membrane feed stream;

a first H2 selective membrane, operable to selectively remove hydrogen from the compressed membrane feed stream through the first H2 selective membrane to generate an H2 rich permeate and the H2 lean stream;

a permeate compressor, operable to compress the H2 rich permeate to generate a second membrane feed stream; and a second H2 selective membrane, operable to selectively remove hydrogen from the second membrane feed stream through the second H2 selective membrane, to generate the H2 rich stream and a membrane recycle stream.

23. A system for treating an acid gas contaminated stream to control emissions, generate hydrogen gas, or generate a greener natural gas, the system comprising:

a sulfur recovery unit, operable to convert sulfur compounds in an acid gas stream to elemental sulfur and further to generate a sulfur recovery unit waste stream;

a tail gas treatment reheater fluidically connected to the sulfur recovery unit, operable to heat the sulfur recovery unit waste stream to generate a heated sulfur recovery unit waste stream;

a tail gas treatment reactor fluidically connected to the tail gas treatment reheater, operable to reduce sulfur compounds in the heated sulfur recovery unit waste stream to hydrogen sulfide, to generate a tail gas stream;

a quench tower fluidically connected to the tail gas treatment reactor, operable to cool the tail gas stream, to generate a sour water stream and a quench tower overhead stream;

an H2S removal unit fluidically connected to the quench tower, operable to absorb hydrogen sulfide from the quench tower overhead stream with a solvent and configured to regenerate the solvent, to generate an H2S lean stream and an H2S rich recycle; and an H2 selective membrane unit fluidically connected to the H2S removal unit, comprising an H2 selective membrane, operable to selectively remove hydrogen from the H2S lean stream through the H2 selective membrane to generate an H2 rich stream and an H2 lean stream.

24. The system of claim 23, wherein the H2 selective membrane unit further comprises:

a membrane feed compressor, operable to compress the H2S lean stream, to generate a compressed membrane feed stream;

a first H2 selective membrane, operable to selectively remove hydrogen from the compressed membrane feed stream through the first H2 selective membrane to generate an H2 rich permeate and the H2 lean stream;

a permeate compressor, operable to compress the H2 rich permeate to generate a second membrane feed stream; and a second H2 selective membrane, operable to selectively remove hydrogen from the second membrane feed stream through the second H2 selective membrane, to generate the H2 rich stream and a membrane recycle stream.

* * * * *